United States Patent
Nomoto et al.

(10) Patent No.: US 7,055,719 B2
(45) Date of Patent: Jun. 6, 2006

(54) SEPARABLE LAMINATED CONTAINER AND ASSOCIATED TECHNOLOGY

(75) Inventors: Tsugio Nomoto, Koto-ku (JP); Takayuki Goto, Koto-ku (JP); Masashi Yoneyama, Koto-ku (JP); Yoshio Shibano, Tochigi (JP); Yoshio Akiyama, Tochigi (JP)

(73) Assignee: Yoshino Kogyosho Co, Ltd., Tokyo (JP)

( * ) Notice: Subject to any disclaimer, the term of this patent is extended or adjusted under 35 U.S.C. 154(b) by 177 days.

(21) Appl. No.: 10/728,957

(22) Filed: Dec. 8, 2003

(65) Prior Publication Data

US 2004/0112921 A1    Jun. 17, 2004

Related U.S. Application Data

(62) Division of application No. 09/866,766, filed on May 30, 2001, now Pat. No. 6,691,494, which is a division of application No. 08/737,020, filed as application No. PCT/JP96/00543 on Mar. 6, 1996, now Pat. No. 6,266,943.

(30) Foreign Application Priority Data

| Mar. 10, 1995 | (JP) | ................................ 7-88558 |
| May 16, 1995 | (JP) | ................................ 7-140105 |
| Jun. 22, 1995 | (JP) | ................................ 7-177936 |
| Aug. 18, 1995 | (JP) | ................................ 7-232038 |
| Sep. 13, 1995 | (JP) | ................................ 7-235463 |

(51) Int. Cl.
    *B65D 35/28*    (2006.01)
(52) U.S. Cl. .................. 222/95; 222/321.9; 222/481.5
(58) Field of Classification Search .................. 222/95, 222/105, 321.7, 321.9, 386.5, 481.5
See application file for complete search history.

(56) References Cited

U.S. PATENT DOCUMENTS

| 4,008,830 A | * | 2/1977 | Meshberg ..................... 222/95 |
| 4,816,093 A | | 3/1989 | Robbins, III |
| 4,898,708 A | | 2/1990 | Holoubek et al. |

(Continued)

FOREIGN PATENT DOCUMENTS

JP    U 04-71681    6/1992

(Continued)

OTHER PUBLICATIONS

Patent Abstracts of Japan, vol. 019, No. 003, Apr. 28, 1995, re: JP-A 06-211243, publ. Aug. 1994.

(Continued)

*Primary Examiner*—Joseph A. Kaufman
(74) *Attorney, Agent, or Firm*—Oliff & Berrdige, PLC

(57) ABSTRACT

A separable laminated container (A) of the present invention comprises an outer layer (1) made of synthetic resin and having an air suction hole (10) and an inner layer (2) made of synthetic resin and separably laminated on the inside of the outer layer, the inner layer having a portion previously separated from the outer layer just around the air suction hole. The air suction hole can be formed by driving a punch into the outer layer at a neck (4) of the separable laminated container from the outside, and punching just the outer layer leaving the inner layer behind. The portion of the inner layer previously separated from the outer layer may be left in the inwardly extended state. The inner layer is preferably made of synthetic resin having flextural modules of less than 10,000 kg/cm$^2$.

4 Claims, 20 Drawing Sheets

U.S. PATENT DOCUMENTS

| | | | |
|---|---|---|---|
| 5,242,085 A | | 9/1993 | Richter et al. |
| 5,301,838 A | | 4/1994 | Schmidt et al. |
| 5,339,596 A | | 8/1994 | Cohen |
| 5,344,045 A | | 9/1994 | Richter et al. |
| 5,407,629 A | | 4/1995 | Schmidt et al. |
| 5,567,377 A | | 10/1996 | Nishigami et al. |
| 5,630,531 A | * | 5/1997 | Gaucher ............ 222/96 |
| 5,682,804 A | | 11/1997 | Moore |
| 5,979,707 A | * | 11/1999 | Bodin et al. ......... 222/95 |
| 6,073,805 A | * | 6/2000 | Gueret ............ 222/95 |
| 6,648,244 B1 | * | 11/2003 | Yu ............ 239/323 |

FOREIGN PATENT DOCUMENTS

| | | |
|---|---|---|
| JP | A 04-339759 | 11/1992 |
| JP | A 05-310265 | 11/1993 |
| JP | U 06-27523 | 4/1994 |
| JP | A 06-505463 | 6/1994 |
| JP | A 06-211243 | 8/1994 |
| JP | A 06-340569 | 12/1994 |
| JP | A 08-080929 | 3/1996 |

OTHER PUBLICATIONS

Patent Abstracts of Japan, vol. 018, No. 576, Nov. 4, 1994, re: JP-A 06-345069, publ. Dec. 1994.

* cited by examiner

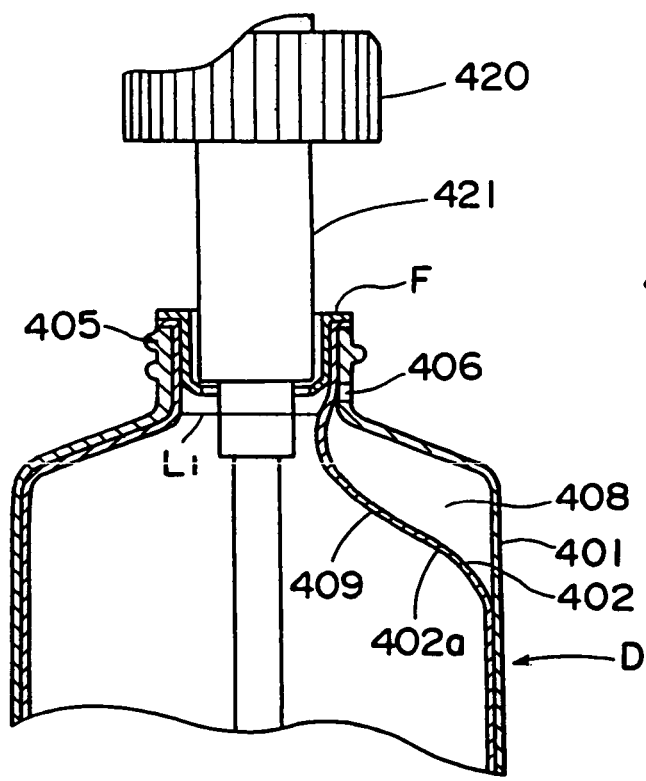
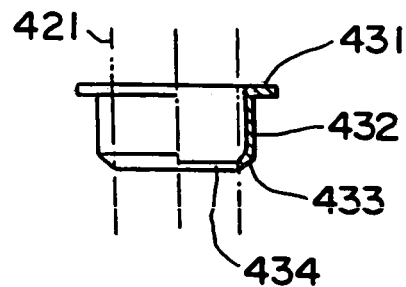
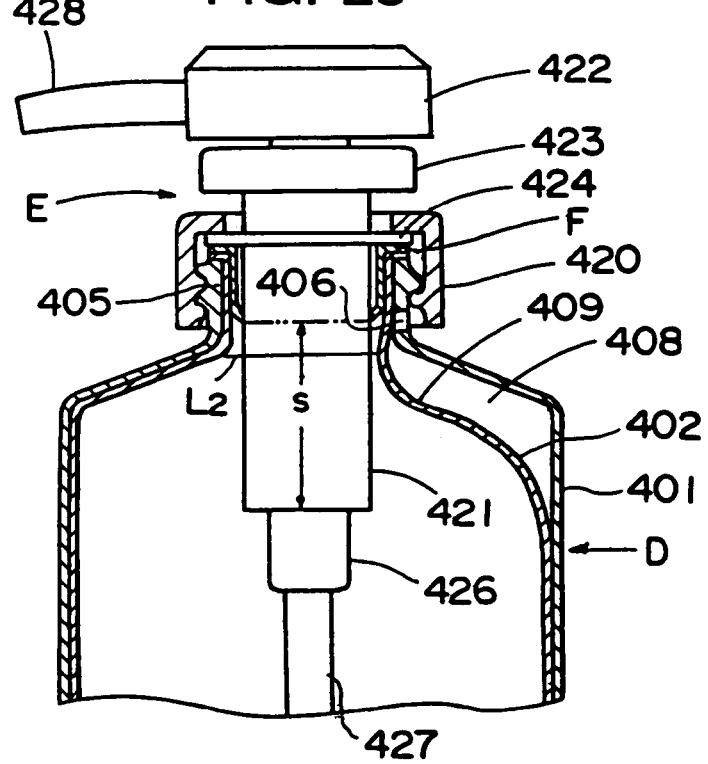

SEPARABLE LAMINATED CONTAINER AND ASSOCIATED TECHNOLOGY

This is a Division of application Ser. No. 09/866,766 filed May 30, 2001 and issued as U.S. Pat. No. 6,691,494 B2 on Feb. 17, 2004, which is in turn a Division of application Ser. No. 08/737,020 filed Nov. 1, 1996 and issued as U.S. Pat. No. 6,266,943 B1 on Jul. 31, 2001, which in turn claims priority under 35 U.S.C. §365 of Japanese Patent Application Nos. Hei 07-088558 filed Mar. 10, 1995, Hei 07-140105 filed May 16, 1995, 7-177936 filed Jun. 22, 1995, Hei 07-232038 filed Aug. 18, 1995, and Hei 07-235463 filed Sep. 13, 1995 in Japan for National Stage of PCT/JP96/00543 on Mar. 6, 1996. The entire disclosures of the prior applications, together with the foreign priority applications, are hereby incorporated by reference in their entirety.

BACKGROUND

1. Technical Field

The present invention relates to a separable laminated container, of which an inner layer is separated from an outer layer and shrinks according to the decrease of the liquid content, and the related arts.

2. Background Art

A separable laminated container is made up of an outer layer and an inner layer which are made of synthetic resin. The inner layer is separably laminated to the outer layer. The separable laminated container is normally used in the sealed state with a pump installed to a neck portion thereof. As the liquid content is poured out by the pump, the inner layer is separated from the outer layer and shrinks according to the decrease of the liquid content. In order to smoothly conduct the shrinkage of the inner layer, the outer layer is provided with an air suction hole.

As one of methods of forming such an air suction hole, a method in which the air suction hole is formed by partially fusing the outer layer of the separable laminated container has been proposed (for example, Japanese Published Unexamined Patent Application No. H06-345069). In this method, the inner layer of the laminated container is made of resin having melting point higher than that of the outer layer and the resin of the outer layer is only fused to form the air suction hole by fusion means which is set at a temperature higher than the melting point of the outer layer and lower than the melting point of the inner layer.

However, the method of forming the air suction hole as mentioned above has following problems.

In case of a little difference between the melting points of the inner layer and the outer layer, it is quite difficult to fuse the outer layer only. Therefore, a predetermined difference in temperature between the melting points of the inner layer and the outer layer is required, thereby restricting the selection of resins used for the inner layer and the outer layer.

Since the air suction hole is formed by fusing the resin of the outer layer by the fusion means, it is difficult to sharply form the air suction hole into a predetermined configuration. Therefore, a finishing is necessary to make the hole neat.

Temperature control is necessary to keep the fusion means in a constant temperature range, thereby complicating the device.

One of the objects of the present invention is to provide a method of forming an air suction hole in an outer layer in a desired configuration and the device.

There is a separable laminated container in which an outer layer and an inner layer are partially bonded as disclosed in Japanese Published Unexamined Patent Application No. H04-339759, Japanese Published Unexamined Patent Application No. H05-310265, or the like. The position where the outer layer and the inner layer are bonded has been considered variously. For example, the bonded portion is provided linearly along the longitudinal direction of the separable laminated container.

By the way, the separable laminated container is normally made in a method as described below.

First, a laminated parison or laminated preform (hereinafter, referred to as the laminated parison) having a laminated structure corresponding to the separable laminated container to be manufactured is molded by extrusion molding. During this molding, a bonded area extending the axial direction is provided in a predetermined position in such a manner as to allow the separation between the outer layer and the inner layer besides the bonded area. Then, the laminated parison is set in the mold and molded into a desired bottle-like configuration by blow molding in such a manner as to have an air suction hole in the outer layer.

For making sure to introduce air through the air suction hole, the position of the air suction hole should be shifted from the bonded area. When the diameter of the air suction hole is equal to or smaller than the width of the bonded area, overlap between the air suction hole and the bonded area results the blockage of the air suction hole so that air can not be introduced into a space the outer layer and the inner layer and the inner layer can not shrink.

However, since there is no mark indicating the position of the bonded area in the conventional separable laminated container, the air suction hole is sometimes formed to be overlapped with the bonded area.

Another one of the objects of the present invention is to provide a separable laminated container allowing an air suction hole to be positively positioned at a portion shifted from the bonded area.

By the way, to smoothly separate the inner layer from the outer layer according to the decrease of the liquid content in the separable laminated container, pre-separation is made before filling the container with the liquid content, for example, as disclosed in Japanese Published Unexamined Patent Application No. 06-345069. The conventional pre-separation is made by blowing air through the air suction hole of the separable laminated container to separate the inner layer from the outer layer, then blowing air into the container through the neck, and deaerating a space between the inner layer and the outer layer through the air suction hole so that the inner layer is returned in such a manner as to cling to the inner surface of the outer layer.

However, in the conventional separable laminated container, the inner layer is made of synthetic resin having a melting point higher than that of the material of the outer layer and flexural modules between 10,000 kg/cm² and 50,000 kg/cm² (measured by ASTM D790 method of measurement) so as to have good distortion resistance, that is, higher elasticity. Therefore, to smoothly separate the inner layer according to the decrease of the liquid content, the inner layer must be completely separated over the entire laminated area during the pre-separation.

For that, a predetermined amount of air according to the dimensions of the container should be blown between the layers. Therefore, there is a problem that the separation can not be completed overall when the control of blowing is mistook.

Further, a control unit is necessary for controlling the amount of air, thereby complicating the device.

As well known, since the outer layer and the inner layer should be made of resin having lower bond properties for the purpose of separating the inner layer from the outer layer, the inner layer and the outer layer are not completely bonded to each other at a pinch-off portion formed at a bottom of the blow-molded container. This causes a cracking of the pinch-off portion and a slit between the layers due to a separation, thereby causing a sealing defect.

Under the circumstances mentioned above, the synthetic resin having good distortion resistance, that is, higher elasticity as described above further facilitates the defect. There is a problem that the container entraps moisture between the inner layer and outer layer from the sealing defect when the container is used in a damp area.

In the conventional pre-separation, the inner layer is separated from the outer layer and then returned in the original position. At this point, the inner layer is compressed against the outer layer, thereby making the separability between the layers low.

Another one of the objects of the present invention is to provide a separable laminated container in which an inner layer can be easily separated from an outer layer, and further another one of the objects is to provide a method and device of pre-separation which is easily completed by partly separating the inner layer with a small amount of air.

Since, once separated from the outer layer, the inner layer is returned in such a manner as to cling to the inner surface of the outer layer in the conventional pre-separation, the level to which the pre-separation is finished does not appear externally so that it is difficult to inspect the level.

Another one of the objects of the present invention is to provide a separable laminated container which allowing the easy inspection of the level to which the pre-separation is finished.

In case of a container for liquid, since the ratio of the amount of liquid content to the capacity of the container is generally constant, larger capacity of the container makes an upper space after filled with the liquid content larger so that the level is sometimes lowered to a lower portion of a shoulder or near an upper end of the drum portion of the container.

In case of installing a pump to the neck of the container, taking into consideration the rise of the level due to the insertion of the pump and troubles for inserting the pump, the liquid content is filled in the container in such a manner as to have larger upper space, thereby sometimes lowering the level.

As the upper space is increased and the level of the liquid is lowered to the lower portion of the shoulder or near the upper end of the drum of the container as mentioned above, the water face of the liquid content waves and the splash of the liquid content becomes violent, thereby bubbling the liquid content and/or generating gases depending on the kind of the liquid content.

As the level of the liquid content is lowered to the upper end of the drum of the container, in case of transparent or translucent container, this gives consumers the impression that the content is less than the indicated amount of content even when the container is filled with the content of amount equal to the indicated amount. Even in case of opaque container, it also gives consumers the same impression because of the degree of the splash of the liquid content when swinging the container.

Another one of the objects of the present invention is to provide a pre-separation method allowing smaller upper space when a container is in the filled state, and a container with a pump allowing smaller upper space.

DISCLOSURE OF INVENTION

The first feature of the present invention is included in a separable laminated container comprising: (a) an outer layer made of synthetic resin and having an air suction hole; and (b) an inner layer made of synthetic resin, and separably laminated on the inside of the outer layer, the inner layer having a portion previously separated from the outer layer just around the air suction hole.

In the separable laminated container with the first feature, air is smoothly introduced between the outer layer and the inner layer even at the first time to pour out the liquid content for use so that the separation of the inner layer is easily made. Since only a part of the inner layer is separated in the pre-separation, a small amount of air for the pre-separation is enough.

In the separable laminated container with the first feature of the present invention, the position of the air suction hole is not limited so that the air suction hole may be formed in any place. Therefore, the air suction hole may be formed in a neck of the container or a drum portion of the container. In addition, the method for forming the air suction hole is also not limited so that a welding means or a punching means by a punch may be employed.

In the separable laminated container with the first feature of the present invention, though the resin materials for the inner layer and the outer layer are not limited, it is preferable that resins which allow the easy separation therebetween are employed. As for the inner layer, a resin with high flexibility is preferably employed.

The separable laminated container with the first feature of the present invention may further comprise a neck, wherein the neck is provided with the air suction hole formed in the outer layer by driving a punch from the outside of the outer layer and punching the outer layer, leaving the inner layer behind.

The separable laminated container with the first feature of the present invention may further comprise a neck, wherein the neck is provided with the air suction hole formed in the outer layer, and wherein the inner layer has an extended portion extended toward the inward of the neck at the part previously separated from the outer layer near the neck. As structured above, the extended portion of the inner layer can be observed from an upper position over the neck of the container, thereby facilitating the check of the state of the pre-separation and thus making the inspection. For pouring out the liquid content, air is securely entered from the first time to pour out the liquid content so as to proceed the separation, thereby improving the entire separability. In case of filling a fixed volume of the liquid content into the container, since the upper space after filling is reduced by the volume excluded by the extended portion, the level of the liquid content can be risen to a desired level by controlling the volume of the air for pre-separation. Particularly, when the level is risen to the neck of the container, it can decrease the waves of the water face of the liquid content during the container A is transported. Even when the liquid content generates gases, the inner layer is moved by the pressure of the gases so that the profile of the container is not changed.

The second feature of the present invention is included in a separable laminated container comprising: (a) an outer layer made of synthetic resin and having an air suction hole; and (b) an inner layer made of synthetic resin having flexural modules of less than 10,000 kg/cm$^2$ and separably laminated on the inside of the outer layer.

In the separable laminated container with the second feature, the synthetic resin having flexural modules of less than 10,000 kg/cm² is employed as the material of the inner layer so that the inner layer separated from the outer layer shrinks according to the decrease of the content in the separable laminated container in use.

In the separable laminated container with the second feature of the present invention, the position of the air suction hole is not limited so that the air suction hole may be formed in any place. Therefore, the air suction hole may be formed in a neck of the container or a drum portion of the container. In addition, the method for forming the air suction hole is also not limited so that a welding means or a punching means by a punch may be employed.

In the separable laminated container with the second feature of the present invention, though the resin materials for the inner layer and the outer layer are not limited but making the inner layer having flexural modules of less than 10,000 kg/cm², it is preferable that resins which allow the easy separation therebetween are employed.

The separable laminated container with the second feature of the present invention may further comprise a neck, wherein the neck is provided with the air suction hole formed in the outer layer.

In the separable laminated container with the second feature of the present invention, a portion of the inner layer adjacent to the air suction hole may be previously partly separated from the outer layer. As structured above, air is smoothly introduced between the outer layer and the inner layer even at the first time to pour out the liquid content for use so that the separation of the inner layer is easily made and the shrinkage and deformation of the inner layer is easily conducted. Since only a part of the inner layer is separated in the pre-separation, a small amount of air for the pre-separation is enough. In this case also, the position of the air suction hole is not limited and the method of forming a hole is not limited.

The separable laminated container with the second feature of the present invention may further comprise a neck, wherein the neck is provided with the air suction hole formed in the outer layer, and wherein a portion of the inner layer adjacent to the air suction hole is partly separated from the outer layer.

The third feature of the present invention is included in a separable laminated container comprising: (a) an outer layer made of synthetic resin, having an air suction hole, and provided with a mark composed of projections or indents which are formed in the outer surface thereof during molding into a container configuration; and (b) an inner layer made of synthetic resin, separably laminated on the inside of the outer layer, and partly bonded with the outer layer by a bonded layer, the bonded layer disposed apart from the air suction hole.

In the separable laminated container with the third feature, the mark is formed during molding into a container configuration so that the positional relation between the bonded area and the mark is defined. Therefore, the mark formed in the outer surface of the outer layer permits the secure recognition of the circumferential direction or the axial direction and the position of the bonded area so that the bonded area and the air suction hole can be securely shifted from each other when the position of the air suction hole is set based on the position of the mark.

In the separable laminated container with the third feature of the present invention, the position of the air suction hole is not limited so that the air suction hole may be formed in any place. Therefore, the air suction hole may be formed in a neck of the container or a drum portion of the container. In addition, the method for forming the air suction hole is also not limited so that a welding means or a punching means by a punch may be employed.

In the separable laminated container with the third feature of the present invention, though the resin materials for the inner layer and the outer layer are not limited, it is preferable that resins which allow the easy separation therebetween are employed. As for the inner layer, a resin with high flexibility is preferably employed. The cross section of the separable laminated container is not limited particularly and thus may be any one of various configurations such as circle, ellipse, and rectangle.

In the separable laminated container with the third feature of the present invention, the bonded area may be linearly formed along the axial direction of the separable laminated container, may be circumferentially formed in a ring-like configuration, or may be partly formed in some spots. In addition, the mark may be formed in a position corresponding to the bonded area or in a position shifted from the bonded area.

In the separable laminated container with the third feature of the present invention, the bonded layer extends in the longitudinal direction of the container.

The fourth feature of the present invention is included in a container with pump comprising: (a) a container body made up of an inner layer and an outer layer which are made of synthetic resin and separably laminated on each other, wherein the outer layer has an air suction hole formed therein and a portion of the inner layer adjacent to the air suction hole is partly separated from the outer layer; and (b) a pump comprising a cylinder inserted into the container body through a neck of the container body and a cap whereby the pump is hermetically fitted to the neck, wherein the cylinder is provided with a flange-like seal around the outer periphery thereof, the flange-like seal coming in contact with the inner surface of the neck tightly.

In the container with pump with the fourth feature, air is smoothly introduced between the outer layer and the inner layer even at the first time to pour out the liquid content for use so that the separation of the inner layer is easily made. Since only a part of the inner layer is separated in the pre-separation, a small amount of air for the pre-separation is enough.

In the container with pump with the fourth feature of the present invention, the inner layer is inwardly extended in the pre-separation of the container. When the cylinder of the pump is inserted through the neck of the container body after filling the liquid content into the container body, the cylinder is inserted with the flange-like seal sealing the neck so that the inner pressure of the container body is risen so as to return the extended portion of the inner layer into the original state, thereby discharging the air, which has been blown between the inner layer and the outer layer, through the air suction hole. The extended portion of the inner layer may be brought in contact with the outer layer by completely discharging the air, which has been blown between the inner layer and the outer layer in the pre-separation. Alternatively, some of the air may be left between the inner layer and the outer layer even after the installation of the pump so that the inner layer and the outer layer is spaced from each other.

In the container with pump with the fourth feature of the present invention, the position of the air suction hole is not limited so that the air suction hole may be formed in any place. Therefore, the air suction hole may be formed in a neck of the container or a drum portion of the container. In addition, the method for forming the air suction hole is also not limited so that a welding means or a punching means by a punch may be employed.

In the container with pump with the fourth feature of the present invention, though the resin materials for the inner layer and the outer layer are not limited, it is preferable that resins which allow the easy separation therebetween are employed. As for the inner layer, a resin with high flexibility is preferably employed.

The fifth feature of the present invention is included in a container with pump comprising: (a) a container body made up of an inner layer and an outer layer which are made of synthetic resin and separably laminated on each other, wherein the outer layer has an air suction hole formed therein and a portion of the inner layer adjacent to the air suction hole is partly separated from the outer layer; (b) a pump comprising a cylinder inserted into the container body through a neck of the container body and a cap whereby the pump is hermetically fitted to the neck; and (c) an inner lid having a ring-like seal coming in contact with the outer surface of the cylinder of the pump tightly, and fitted in the neck of the container body.

In the container with pump with the fifth feature, air is smoothly introduced between the outer layer and the inner layer even at the first time to pour out the liquid content for use so that the separation of the inner layer is easily made. Since only a part of the inner layer is separated in the pre-separation, a small amount of air for the pre-separation is enough.

In the container with pump with the fifth feature of the present invention, the inner layer is inwardly extended in the pre-separation of the container. When the cylinder of the pump is inserted through the neck of the container body after filling the liquid content into the container body and fitting the inner lid into the neck of the container body, the cylinder of the pump is inserted with the cylinder sealing the ring-like seal so that the inner pressure of the container body is risen so as to return the previously extended portion of the inner layer into the original state, thereby discharging the air, which has been blown between the inner layer and the outer layer, through the air suction hole. The extended portion of the inner layer may be brought in contact with the outer layer by completely discharging the air, which has been blown between the inner layer and the outer layer in the pre-separation. Alternatively, some of the air may be left between the inner layer and the outer layer even after the installation of the pump so that the inner layer and the outer layer is spaced from each other.

In the container with pump with the fifth feature of the present invention, the position of the air suction hole is not limited so that the air suction hole may be formed in any place. Therefore, the air suction hole may be formed in a neck of the container or a drum portion of the container. In addition, the method for forming the air suction hole is also not limited so that a welding means or a punching means by a punch may be employed.

In the container with pump with the fifth feature of the present invention, though the resin materials for the inner layer and the outer layer are not limited, it is preferable that resins which allow the easy separation therebetween are employed. As for the inner layer, a resin with high flexibility is preferably employed.

In the container with pump with the fifth feature of the present invention, the cylinder may have narrow grooves or a roughened surface on the outer surface thereof extending from the lower edge thereof to a position above the seal of the inner lid after installation of the pump.

In the container with pump with the fifth feature of the present invention, the seal of the inner lid may have a narrow groove or a roughened surface formed in a sealing surface thereof.

In the container with pump with the fifth feature of the present invention, the seal of the inner lid may protrude inward and upward in such a manner as to elastically expand and contract in the radial direction.

The sixth feature of the present invention is included in a punching method of an air suction hole in a separable laminated container comprising steps of: driving a punch from the outside into a neck of a container body made up of an inner layer and an outer layer which are made of synthetic resin and separably laminated on each other; and punching out the outer layer by the blade of the punch, leaving the inner layer behind.

In the punching method with the sixth feature, the outer layer is punched by the blade of the punch leaving the inner layer behind so that the air suction hole can be formed only in the outer layer whereby the air suction hole can be quite easily formed. The air suction hole can be formed in the same configuration as that of the blade and the hole is neatly made only by the punching so that no finishing after the punching is required. Particularly when this punching method is conducted during the molded container is in a predetermined range of temperature after blow molding, it further facilitates and secures the formation of the air suction hole.

The seventh feature of the present invention is included in a punching device comprising: (a) a pedestal which is inserted into a neck of a container body made up of an inner layer and an outer layer, which are made of synthetic resin and separably laminated on each other, to come in contact with an inner surface of the neck; (b) a punch supported in such a manner as to come close to and move away from the pedestal, the punch having a tubulous blade; and (c) a space keeping mechanism for keeping a distance between the tubulous blade and the pedestal constant when the punch is at the nearest position to the pedestal.

The punching device with the seventh feature is suitable for carrying out the invention of the punching method with the sixth feature.

The punching device with the seventh feature of the present invention has a simple structure and facilitates the formation of the air suction hole. Since the punch pushes the inner layer at the same time of punching out the outer layer, the separation between the layers are made around the air suction hole during punching, thereby allowing the inner layer to be quite easily separated from the outer layer.

The punching device with the seventh feature further comprises an adjusting mechanism for adjusting the distance between the tubulous blade and the pedestal at a point in time when the punch is at the nearest position to the pedestal. As structured above, the adjusting mechanism adjusts the distance between the tubulous blade and the pedestal so that the air suction hole can be formed only in the outer layer even with a spread in the thickness of the inner layer.

The eighth feature of the present invention is included in a pre-separation method for a separable laminated container comprising steps of: punching an air suction hole in an outer layer of a separable laminated container made up of an inner layer and the outer layer which are made of synthetic-resin and separably laminated on each other; and introducing a little amount of air through the air suction hole to previously separate a portion of the inner layer around the air suction hole from the outer layer.

In the pre-separation method with the eighth feature, since only a part of the inner layer is separated, a small amount of air for the pre-separation is enough and it is not necessary to change the volume of the air even with containers of somewhat different volumes, thereby allowing easy operation. The extended portion of the inner layer may be brought in contact with the outer layer again or may be left in the state separated from the outer layer.

In the pre-separation method with the eighth feature, the method of forming the air suction hole is not limited so that the hole may formed by welding the outer layer or punching only the outer layer by a punch.

In the pre-separation method with the eighth feature, the inner layer of the separable laminated layer is preferably made of synthetic resin having flexural modules of less than 10,000 kg/cm$^2$. This facilitates the separation of the inner layer and allows smooth shrinkage and deformation of the inner layer during using the separable laminated container.

The ninth feature of the present invention is included in a pre-separation method for a separable laminated container comprising steps of: punching an air suction hole in an outer layer of a separable laminated container made up of an inner layer and the outer layer which are made of synthetic resin and separably laminated on each other; introducing a little amount of air through the air suction hole to previously separate a portion of the inner layer around the air suction hole from the outer layer; blowing air into the inside of the separable laminated container to discharge the air introduced between the inner layer and the outer layer; and bringing the separated layer in contact with the outer layer again.

In the pre-separation method with the ninth feature, since only a part of the inner layer is separated, a small amount of air for the pre-separation is enough and it is not necessary to change the volume of the air even with containers of somewhat different volumes, thereby allowing easy operation. Though the inner layer separated from the outer layer is brought in contact with the outer layer again, the separated inner layer can be easily separated from the outer layer again.

In the pre-separation method with the ninth feature, the method of forming the air suction hole is not limited so that the hole may formed by welding the outer layer or punching only the outer layer by a punch.

In the pre-separation method with the ninth feature, the inner layer of the separable laminated layer is preferably made of synthetic resin having flexural modules of less than 10,000 kg/cm$^2$. This facilitates the separation of the inner layer and allows smooth shrinkage and deformation of the inner layer during using the separable laminated container.

The tenth feature of the present invention is included in a pre-separation method for a separable laminated container comprising steps of: punching an air suction hole in an outer layer of a separable laminated container made up of an inner layer and the outer layer which are made of synthetic resin and separably laminated on each other; introducing a little amount of air through the air suction hole to previously separate a portion of the inner layer around the air suction hole from the outer layer; installing a pump to a neck of the separable laminated container after filling liquid content in the separable laminated container; sealing a space between the cylinder of the pump and the neck by a seal when a cylinder of the pump is inserted into the neck during the installation so as to discharge at least some of the air introduced between the inner layer and the outer layer.

In the pre-separation method with the tenth feature, at least some of the air previously introduced between the inner layer and the outer layer is enough to be discharged through the air suction hole. This means that the inner layer may be returned to come in contact with the inner surface of the outer layer by completely discharging the introduced air during the installation of the pump, or, some of the air may be left between the inner layer and the outer layer even after the installation of the pump so that the inner layer and the outer layer is spaced from each other.

In the pre-separation method with the tenth feature, since only a part of the inner layer is separated, a small amount of air for the pre-separation is enough. The step of completely or partly returning the inner layer to the original state and the step of installing the pump to the separable laminated container can be conducted by one action, thereby facilitating the manufacturing process of the container with pump.

In the pre-separation method with the tenth feature, the method of forming the air suction hole is not limited so that the hole may formed by welding the outer layer or punching only the outer layer by a punch.

In the pre-separation method with the tenth feature, the amount of residual air in the inner layer after installation of the pump may be controlled by controlling the amount of air introduced through the air suction hole to partly separate the inner layer from the outer layer.

In the pre-separation method with the tenth feature, the seal is formed on the circumference of the cylinder of the pump and the amount of air discharged through the air suction hole during the installation of the pump can be controlled by the sliding range of the seal against the neck and the position of the air suction hole.

In the pre-separation method with the tenth feature, the seal comprises an inner lid fitted in the neck in such a manner as to allow the insertion of the cylinder of the pump therethrough and the amount of air discharged through the air suction hole during the installation of the pump can be controlled by the length of the cylinder inserted into the seal.

In the pre-separation method with the tenth feature, the separated inner layer can be brought in contact with the outer layer again by adjusting the amount of air introduced through the air suction hole to the same amount of the air discharged through the air suction hole during the installation of the pump.

The eleventh of the present invention is included in a pre-separation device for a separable laminated container comprising; (a) a first air supply member for supplying air between an inner layer and an outer layer of a separable laminated container, which are made of synthetic resin and separably laminated on each other, through an air suction hole punched in the outer layer of the separable laminated container; (b) a second air supply member for blowing air into the separable laminated container through a neck of the separable laminated container; (c) a pressurized air supply device for supplying pressurized air into the first air supply member and the second air supply member; (d) a pressurized air storage disposed between the first air supply member and the pressurized air supply device; (e) solenoid valves disposed between the pressurized air supply device and the pressurized air storage, between the first air supply member and the pressurized air storage, and between the second air supply member and the pressurized air supply device, respectively; and (f) a control means for activating the solenoid valves at predetermined timings.

The pre-separation device with the eleventh feature is suitable for carrying out the invention of the punching method with the ninth feature. A little volume of the pressurized air of the pressurized air supply device is first stored in the pressurized air storage, then the pressurized air stored in the pressurized air storage is introduced between the inner layer and the outer layer of the separable laminated container through the air suction hole by the first air supply member so as to separate the inner layer around the air suction hole from the outer layer, and after that, the separated inner layer is brought in contact with the inner surface of the outer layer by blowing the pressurized air into the separable laminated container by the second air supply member. A sequence of actions as mentioned above are securely and easily carried out by controlling the solenoid valves by the control means.

The pre-separation device with the eleventh feature of the present invention may further comprise an adjusting means for adjusting the amount of the pressurized air stored in the pressurized air storage. As the adjusting means are provided as mentioned above, the volume of the air for separating the inner layer can be changed if necessary.

In the pre-separation device with the eleventh feature of the present invention, the first air supply member may comprise a nozzle inserted into the air suction hole of the separable laminated container, wherein the nozzle is opened at the front end and a side thereof so that the air supplied between the inner layer and the outer layer is discharged through the nozzle when air is blown into the separable laminated container through the second air supply member. As structured above, the air introduced between the inner layer and the outer layer can be completely discharged with the second air supply member is mounted on the separable laminated container, with the result that the entire surface of the separated inner layer can be brought in contact with the inner surface of the outer layer as the original state.

BRIEF DESCRIPTION OF DRAWINGS

FIG. 27 is a sectional view showing components in a container with pump in an initial stage of installing a pump according to a sixth embodiment of the present invention;

FIG. 28 is a sectional view showing components in the container with pump when the installation of the pump is completed according to the sixth embodiment of the present invention;

FIG. 29 is a half-sectional view of an inner lid of the container with pump according to the sixth embodiment of the present invention;

BEST MODE FOR CARRYING OUT THE INVENTION

Hereinafter, embodiments of the present invention will be described with reference to attached drawings.

[First Embodiment]

Figure 1:
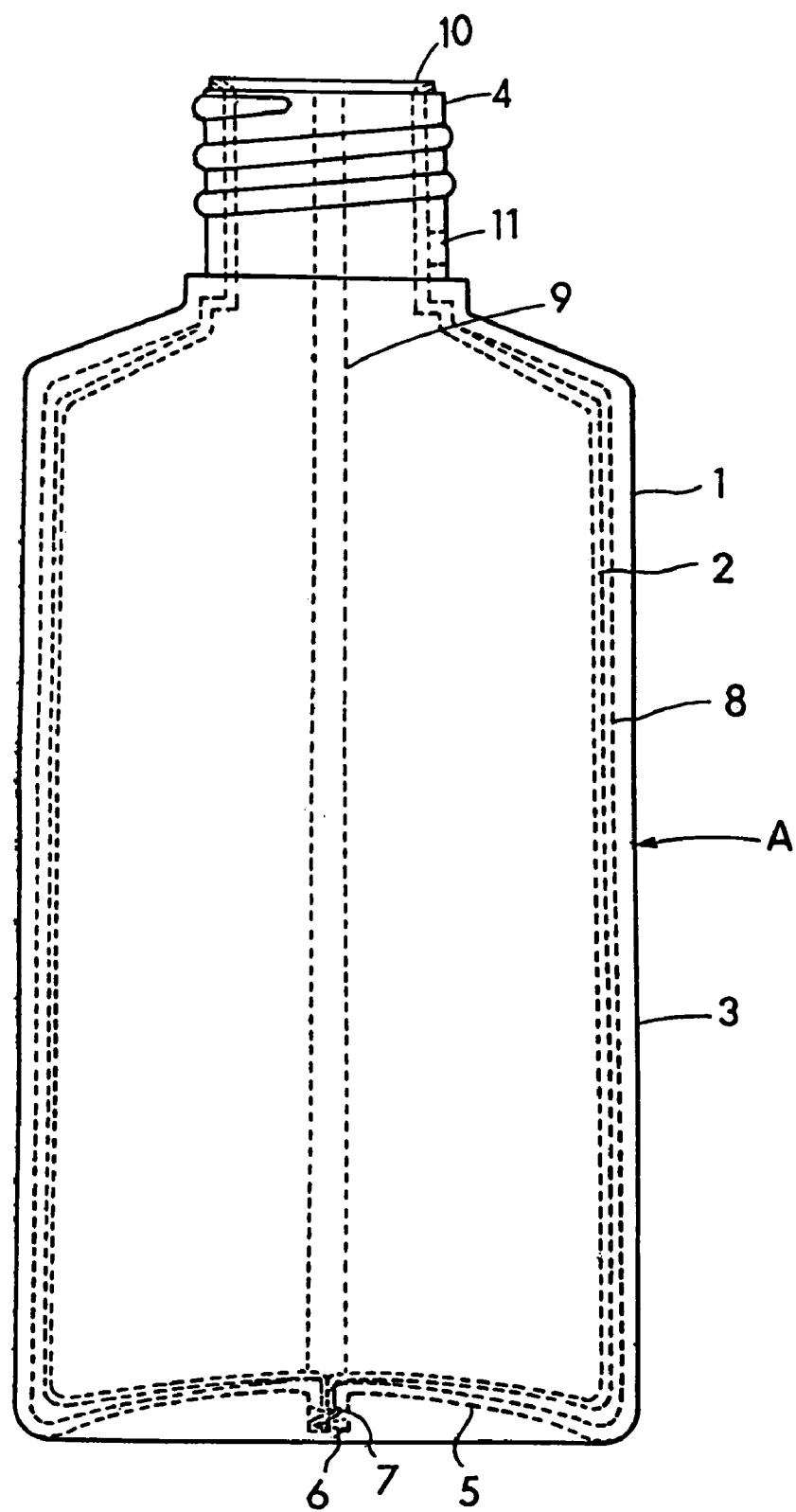
FIG. 1 is a front view showing a separable laminated container according to a first embodiment of the present invention.

FIG. 1 is a front view of a separable laminated container A-according to a first embodiment. The separable laminated container A is made up of an outer layer 1 and an inner layer 2, is formed by blow molding, and comprises a drum portion 3, a neck 4, and a bottom 5.

The outer layer 1 is made of high-density polyethylene to keep the profile of the container, and the inner layer 2 is an inner bag made of nylon which is separable from the outer layer and deformable. There is a separated area 8 formed between the outer layer 1 and the inner layer 2 and a bonded area 9 where the outer layer 1 and the inner layer 2 are partly bonded in the longitudinal direction.

The bottom 5 of the container A is provided with a projection 6 which is formed by pinch-offs of a mold during the molding. The projection 6 is provided with a plurality of sunk portions 7 which are arranged zigzag and each sunk in the opposite bonded layer.

The projection 6 allows the inner layer 2 strongly bonded to the outer layer 1 even when the inner layer 2 is made of resin such as nylon providing weak bond strength, thereby preventing the occurrence of slit due to the separation between the layers and thus preventing the entrapment of moisture.

The neck 4 is provided with an engaging portion 10 formed at an upper end of inner layer 2 by an air blowing member during the blow molding.

The neck 4 is also provided with an air suction hole 11 formed by a punching device in a punching method of the present invention. The air suction hole 11 is a hole for introducing air into a space between the inner layer 2 and the outer layer 1 in order to smoothly achieve the separation of the inner layer 2 with keeping the profile of the container A to completely pour out the content.

Figure 2:
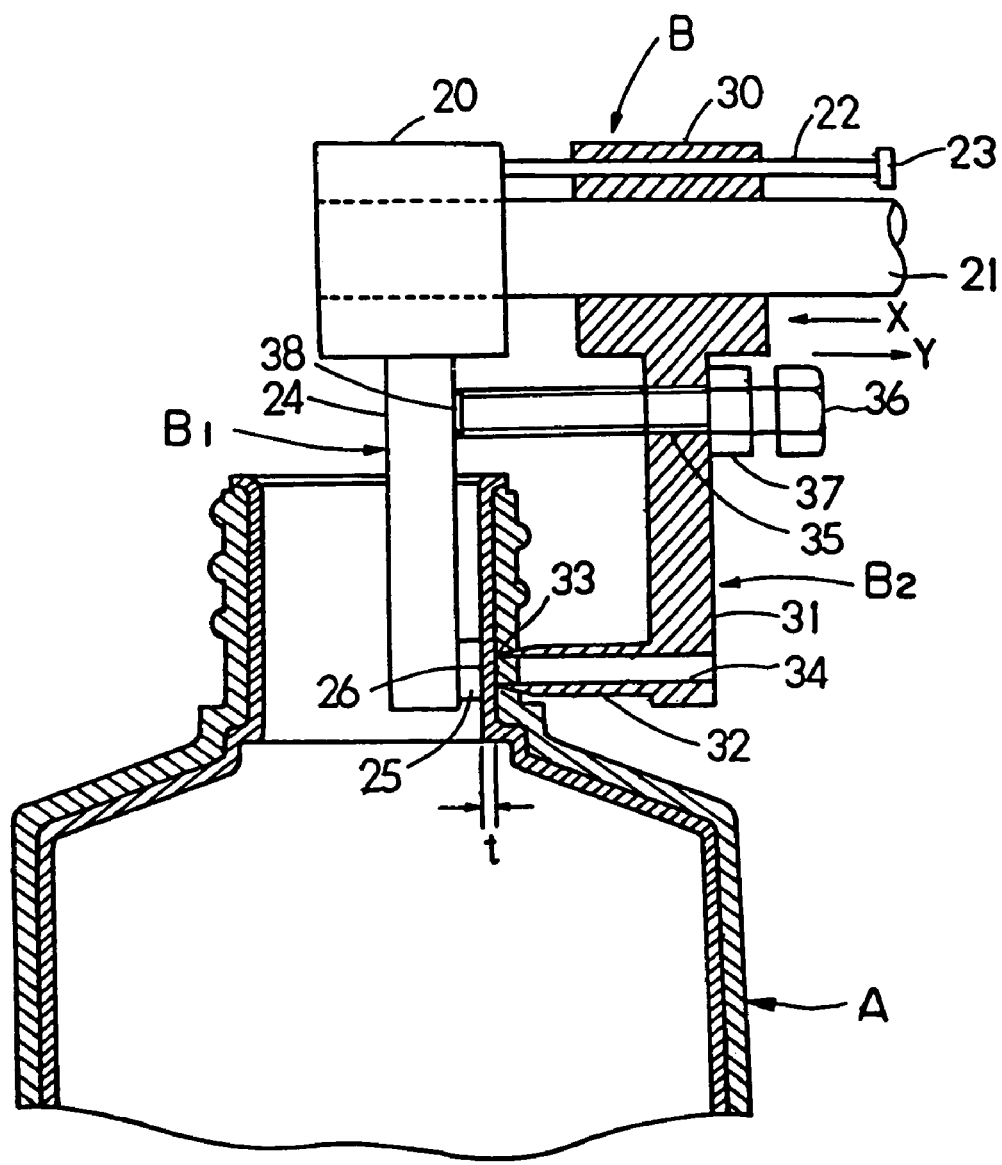
FIG. 2 is a front view showing a punching device of the first embodiment of the present invention, parts being broken away.

Hereinafter, the description will be made as regard to a method of punching the air suction hole and the punching device of the present invention, with reference to FIG. 2.

The punching device B is disposed during cooling stage of the blow-molded container A and mounted on a supporting bed (not shown) capable of moving vertically and laterally.

The punching device B comprises a receiving member $B_1$ and a cutting member $B_2$ which are mounted on a supporting member 20.

The supporting member 20 is mounted on the supporting bed (not shown) and comprises a supporting shaft 21 and a guiding pole 22, wherein the guiding pole 22 is arranged in parallel with the supporting shaft 21 and is provided with a stopper 23 at the end thereof.

The receiving member $B_1$ comprises a supporting pole 24, which is fixed to the supporting shaft 21 and extends downward, and a pedestal 25 disposed at an end of the supporting pole 24.

The cutting member $B_2$ comprises a sliding member 30, which is not allowed to rotate relative to the supporting shaft 21 and the guiding pole 22 and is allowed to slide laterally, a supporting pole 31 extending downward from the sliding member 30, and a punch 32 disposed at the end of the supporting pole 31 in such a manner as to face the pedestal 25.

The punch 32 is provided with a tubulous blade 33 at the end thereof and a clearance hole 34 formed therein for discharging a chip.

The supporting pole 31 is provided with an internal thread 35 formed at the proximal end side thereof, into which a bolt 36 as a stopper is screwed and fixed by a lock nut 37 not to shift from a fixed position.

Where the distal end 38 of the bolt 36 comes into contact with the supporting pole 24 of the receiving member $B_1$, there is a distance t between the tubulous blade 33 and the receiving face 26 of the pedestal 25. The size of the distance t is adjustable by adjusting the position of the bolt 36 relative to the internal thread 35. It should be noted that the bolt 36 and the supporting pole 24 constitute a space keeping mechanism and the internal thread 35, the bolt 36, and the lock nut 37 constitute an adjusting mechanism.

The supporting bed is provided with driving means (not shown) for moving the sliding member 30 laterally in such a manner that the sliding member 30 reciprocates between a waiting position where the sliding member 30 comes into contact with the stopper 23 disposed at the end of the guiding pole 22 and a punching position where the distal end 38 of the bolt 36 comes into contact with the supporting pole 24 of the receiving member.

A combination of an electric or mechanical driving source, which is controlled in connection with the stopping member, and suitable transmitting means can be selected as the driving means, or manual means may also be employed as the driving means.

Though the waiting position and the punching position of the sliding member 30 are defined by the stopping member in this embodiment, these may be defined by controlling the operational range of the driving means instead of the stopping member.

The description will now be made as regard to the operation of the punching device B and the punching method of the present invention.

As mentioned above, the punching device B is disposed during the cooling stage and the punching is performed during the container A has a predetermined temperature before returning to the room temperature.

During the punching device B is in non-operation, the supporting bed is positioned above the container A in such a manner as to move the container A. Therefore, the receiving member $B_1$ and the cutting member $B_2$ are also positioned above the container A as well as the supporting member 20.

The sliding member 30 is positioned at the waiting position at a predetermined distance from the supporting member 20.

As the container A prior to punching is moved to a predetermined position, the supporting bed relatively moves downward against the container A, the supporting pole 24 mounted on the supporting member 20 is inserted into the neck 4 of the container A, and the pedestal 25 is disposed at a position being in contact with the inner layer 2.

At the same time, the cutting member B2 mounted on the sliding member 30 moves downward as well as the supporting member 20 in such a manner that the pedestal 25 and the tubulous blade 33 of the punch 32 face each other to put the inner layer 2 and the outer layer 1 of the neck 4 of the container A therebetween.

Then, the sliding member 30 is moved in the direction of X by the driving means so that the punch 32 moves until the distal end 38 of the bolt 36 comes into contact with the supporting pole 24.

At this point, the punch 32 presses the inner layer 2 of the neck 4 of the container A to the receiving face 26 of the pedestal 25 and then the tubulous blade 33 is pressed to enter into the outer layer 1 of the neck 4 of the container A so as to punch the outer layer 1, leaving the inner layer 2 behind, thereby punching the air suction hole 11 in the outer layer 1.

Since the punching is performed during the container A has the predetermined temperature after the container A is formed by blow molding, the outer layer is easily punched by the punch 32.

After the punching, the sliding member 30 moves in the direction of Y to return to the waiting position and the supporting member 20 moves upward for the next punching.

As the distance t between the tubulous blade 33 at the end of the punch 32 and the receiving face 26 is adjusted to the thickness of the inner layer 2, the air suction hole can be formed only in the outer layer 1.

Though there is a spread in the thickness of the inner layer 2 formed by blow molding, the distance t is set to the minimum thickness of the inner layer 2, thereby punching the air suction hole 11 only in the outer layer 1 even with the spread in the thickness.

In the next stage after the punching, for a pre-separation between the outer layer 1 and the inner layer 2, air is blown through the air suction hole 11 thus punched to introduce the air into a space between the inner layer 2 and the outer layer 1.

Since the layers have been separated at the periphery of the air suction hole 11 during the punching, the separation throughout the layers can be easily made only by introducing a small amount of air.

According to the punching method and the punching device of the present invention, the air suction hole 11 can be quite easily formed in the outer layer 1 of the neck 4 of the container A. Further, the air suction hole can be formed in a predetermined configuration by the tubulous blade, that is, the hole is neatly made only by the punching so that no finishing after the punching is required. In addition, the punching device can be easily structured.

[Second Embodiment]

Figure 3:
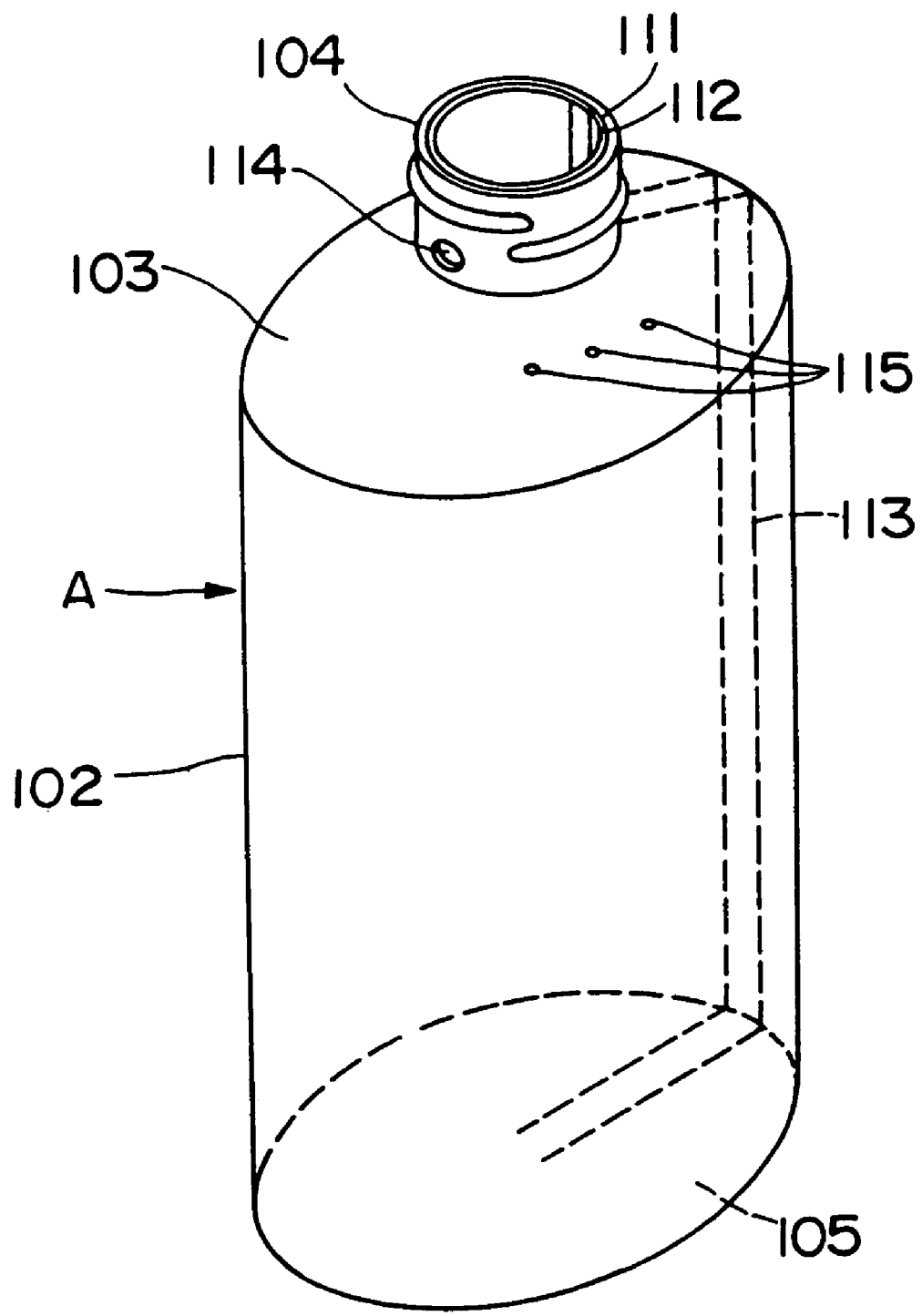
FIG. 3 is a perspective view of a separable laminated container according to a second embodiment of the present invention.
Figure 4:
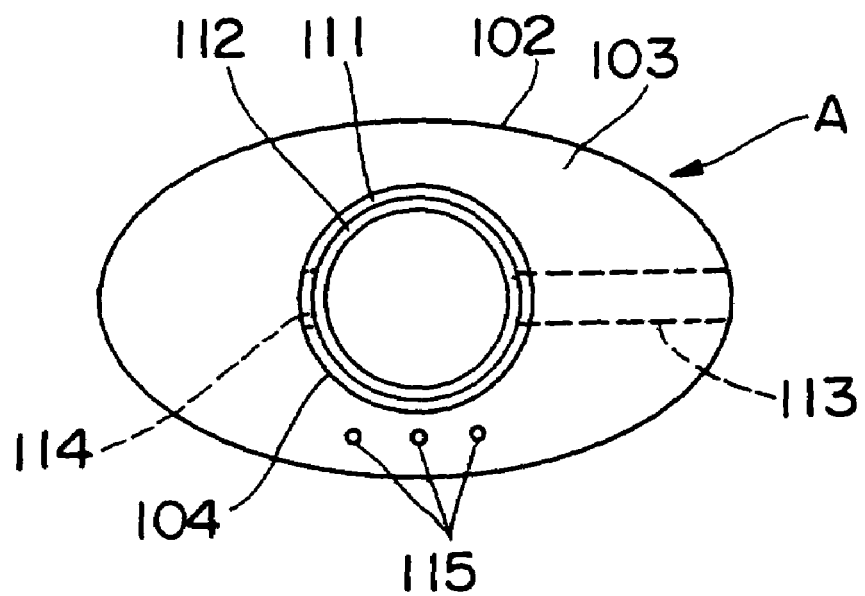
FIG. 4 is a plan view of the separable laminated container according to the second embodiment of the present invention.
Figure 5:
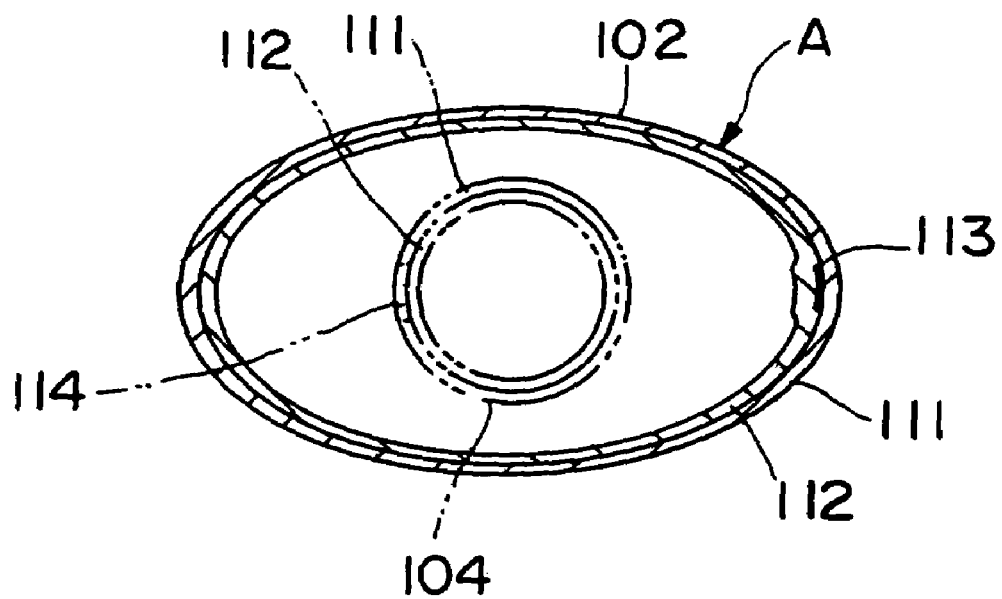
FIG. 5 is a cross sectional view showing the separable laminated container according to the second embodiment of the present invention before separation of an inner layer.

FIG. 3 is a perspective view of a separable laminated container A according to a second embodiment, FIG. 4 is a plan view of the same, and the FIG. 5 is a cross-sectional view of a drum portion thereof.

The container A comprises a drum portion 102 having an elliptical section, a shoulder 103 continuously connected to the upper part of the drum portion 102, and a cylindrical neck 104 extending upward from the center of the shoulder 103. The container A is made up of an outer layer 111 and an inner layer 112 overall from the neck 104 to a bottom 105 of the drum portion 102. The outer layer 111 and the inner layer 112 are bonded each other at a strip of bonded area 113, while the outer layer 111 and the inner layer 112 are just in contact with each other besides the bonded area 113 in such a manner as to be separable from each other. FIG. 5 shows a state before the inner layer 112 is separated from the outer layer 111.

The bonded area 113 linearly extends from the top of the neck 104 to the lower edge of the drum portion 102 in the longitudinal direction of the container A and extends to the center of the bottom 105.

The neck 104 of the container A is provided with an air suction hole 114 formed in the outer layer 111, 180° apart from the bonded area 113 in the peripheral direction. The air suction hole 114 is pierced only in the outer layer 111, not in the inner layer 112.

The shoulder 103 is provided with three projections 115 formed in a line, as marks for peripheral positioning, in position 90° apart form the bonded area and the air suction hole 114 in the peripheral direction. In other words, the bonded area 113 is positioned at the right side of and 90° apart from the projections 115 in the peripheral direction and the air suction hole 114 is positioned at the left side of and 90° apart from the projections 115 in the peripheral direction.

In the container A, a pump not shown is mounted in the neck 104 with the suction tube inserted into the container A through the neck 104 so that the content filled inside the inner layer 112 is pumped up and poured out through the pump.

According to the decrease of the content within the inner layer 112, the inner layer 112 is separated from the outer layer 111 and shrinks. Where in the inner layer 112 the separation and shrinkage are started is dependent on the thickness distribution of the inner layer 112 or the like. Usually, the separation and shrinkage are started from a distant portion from the bonded area 113. When the pre-separation between the out r layer 111 and the inner layer 112 was made before filling the content, the separation and the shrinkage are started from the pre-separated portion.

During the shrinkage of the inner layer 112, air is introduced between the outer layer 111 and the inner layer 112 through the air suction hole 114, thereby making the shrinkage of the inner layer 112 secure and smooth.

The container A is made as follows.

First, a laminated parison or laminated preform (hereinafter, referred to as the laminated parison) having a laminated structure corresponding to the separable laminated container to be manufactured is molded by extrusion molding or the like. During this molding, a bonded area extending the axial direction is provided in a predetermined position along the whole length thereof in such a manner as to allow the separation between the outer layer and the inner layer besides the bonded area.

Then, the laminated parison is set in the mold and molded into a desired bottle-like configuration by blow molding in such a manner as to have an air suction hole in the outer layer. The blow mold is provided with three little concavities in a molding face of the shoulder 103, which is elliptical as seen from the top, of the container at the minor axis side thereof. These concavities are to form the projections 115 as marks for peripheral positioning. The projections 115 are formed by pushing parts of the outer layer into the concavities.

The laminated parison is set in the mold in such a manner that the bonded area of the laminated parison is positioned at the major axis side of the molding face of the elliptical shoulder 103. Therefore, the projections 115 can be made at the position 90° apart form the bonded area 113 in the peripheral direction.

As mentioned above, since the projections 115 are formed during the molding into the bottle-like configuration, the positional relation between the bonded area 113 and the projections 115 is defined.

After the blow molding into the desired container configuration as mentioned above, the air suction hole 114 is punched in the outer layer 111 of the neck 104 by using the punching device of the aforementioned first embodiment. During the punching, the air suction hole 114 is punched at a position 90° apart from the projections 115 in the peripheral direction on the left of the projections 115 as seen with the projections 115 positioned on this side so that the air suction hole 114 can be positioned at the opposite side of (180° apart from) the bonded area 113, thereby securely preventing the overlapping of the bonded area 113 and the air suction hole 114.

That is, since the position of the projections 115 of the shoulder 103 is defined, the position of the bonded area 113 is also defined. As the punched position of the air suction hole 114 is defined on the basis of the projections 115, the bonded area 113 and the air suction hole 114 can be securely formed apart from each other.

When a sensor such as an optical sensor is used for detecting the projections 115, the container A can be controlled in its position and its direction on the basis of a detecting signal from the sensor for setting the container A to the punching device so as to compile with an on-line automatic production system.

Though the air suction hole 114 is punched in the neck 104 of the container A by the punching device as mentioned in the first embodiment, the air suction hole 114 may be formed by any other hole-forming device than the punching device of the first embodiment or welding means.

The good result was obtained when the container A of this embodiment was made in such a manner that the outer layer 111 was made of polyethylene, the inner layer 112 was made of nylon, and the outer layer 111 and the inner layer 112 were bonded with ADMER (adhesive polyolefin) (trade mark, by Mitsui Sekyu-Kagaku Kogyo Kabushikikaisha) to form the bonded area.

The good result was also obtained when the container A was made in such a manner that the inner layer 112 was made by laminating ADMER on a nylon layer to decrease the water vapor permeability of the inner layer 112.

[Third Embodiment]

Figure 6:
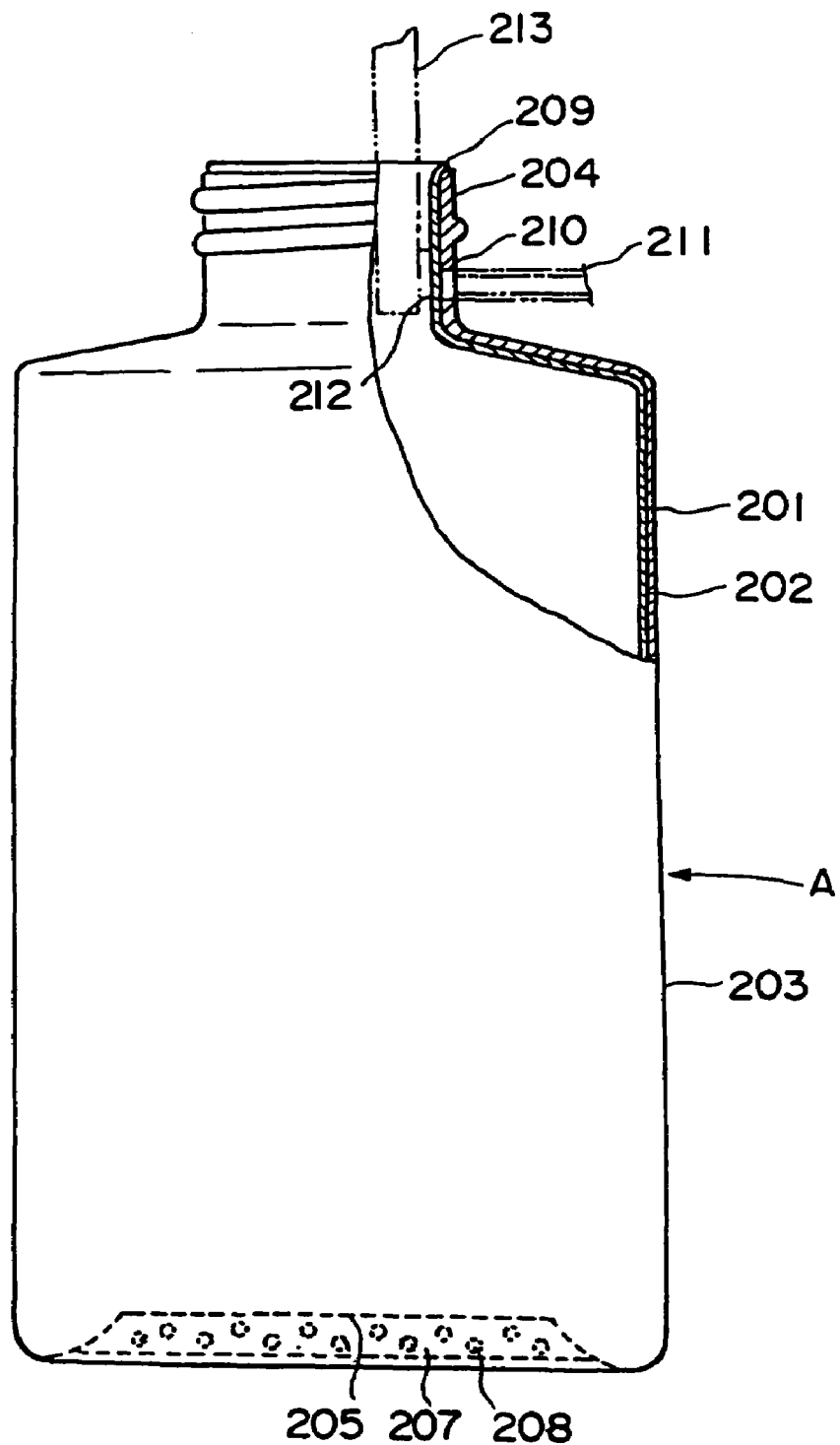
FIG. 6 is a front view of a separable laminated container according to a third embodiment of the present invention, parts being broken away.
Figure 7:
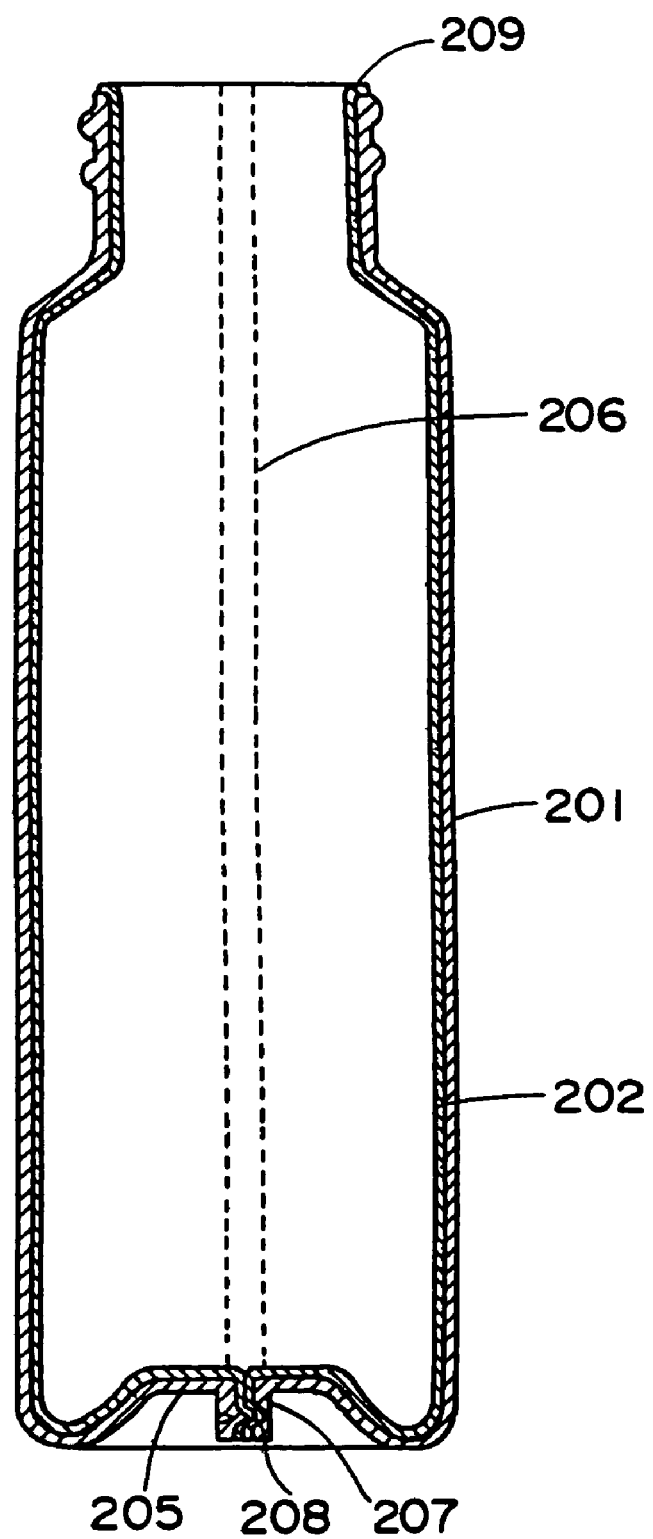
FIG. 7 is a longitudinal sectional view of the separable laminated container according to the third embodiment of the present invention, as shown from the right side.

FIG. 6 is a front view of a separable laminated container A according to a third embodiment wherein parts being broken away and FIG. 7 is a longitudinal sectional view of the same, as seen from the side.

The separable laminated container A is made up of an outer layer 201 and an inner layer 202 and comprises a drum portion 203, a neck 204, and a bottom 205.

The outer layer 201 is made of high-density polyethylene to keep the profile of the container, and the inner layer 202 is an inner bag made of nylon which is separable from the outer layer and deformable. The outer layer 201 and the inner layer 202 of the container A are made by blow molding of a laminated parison which is formed by co-extrusion.

In this embodiment, the nylon used in the inner layer 202 is copolymer of nylon 6 having flexural modules of 650 kg/cm$^2$, providing excellent flexibility.

Besides the nylon 6, any other nylon or any other synthetic resin material may be employed for the inner layer 202. However, when the inner layer 202 is made of nylon 12 having flexural modules of 12,000 kg/cm$^2$, the pre-separation should be made throughout the laminated face.

Therefore, synthetic resin having flexural modules of equal to or more than 10,000 kg/cm$^2$, that is, higher elasticity results a problem of difficulty of pre-separation and a problem of separation in the bottom. Therefore, it is preferable that the synthetic resin of the inner layer 202 has flexural modules of less than 10,000 kg/cm$^2$.

The outer layer 201 and the inner layer 202 are partly bonded in the longitudinal direction by a bonded area 206. The bonded area 206 is provided if necessary and is formed at the same time as the laminated parison by co-extrusion of the materials of the outer layer and the inner layer.

In case of providing the bonded area 206, the bonded area 206 prevents the deformation of the inner layer 202 in the vertical direction and allows the reduction and shrinkage in the radial direction during the deformation of the inner layer 202 so as to easily pour out the liquid content.

The bottom 205 of the container A has a projection 207 which is provided with a plurality of sunk portions 208 formed by pinch-offs of the mold during blow molding.

By providing such a projection 207 having the-sunk portions 208, the bottom sealing portion can be strongly bonded even when the inner layer 202 is made of resin such as nylon providing weak bond strength, thereby preventing the separation between the layers and the cracking of the bottom.

The neck 204 is provided with an engaging portion 209 formed at an upper end of inner layer 202 by an air blowing member during the blow molding, thereby preventing the dip of the inner layer 202.

The neck 204 is provided with an air suction hole 210 punched in the outer layer 201. The air suction hole 210 is a hole for introducing the atmospheric air into a space between the inner layer 202 and the outer layer 201 in order to smoothly achieve the separation of the inner layer 202 with keeping the profile of the container A to completely pour out the liquid content.

The air suction hole 210 is punched by using the punching device of the aforementioned first embodiment, that is, by setting a receiving face 212 of the receiving member 213 inside the neck 204 of the container A, driving a punch 211 into the outer layer 201 from the outside, and punching the outer layer 201 with the tubulous blade at the end of the punch 211 leaving the thickness of the inner layer 202 behind.

In the container A, the inner layer 202 is previously separated from the outer layer 201 before filling the liquid content, that is, the pre-separation is made.

With reference to FIG. 8 through FIG. 13, a pre-separation device C used in the pre-separation.

The pre-separation device C comprises a first air supply member 230 for introducing pre-separating air through the air suction hole 210 and a second air supply member 230 for pressing the container A at a predetermined position and introducing air into the container A through the neck 204.

The first air supply member 220 has a cylindrical body 221 which is provided with a through hole 222 inside thereof, a nozzle 223 at the front end of the cylindrical body 221, and a mounting portion 224 at the rear end of the cylindrical body 221, wherein the mounting portion 224 is provided with an internal thread 225 into which an air supply pipe is screwed.

Figure 10:
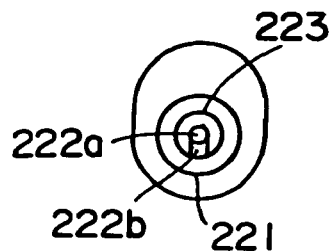
FIG. 10 is a left side view of a first air supply member of the pre-separation device in the third embodiment of the present invention.
Figure 11:
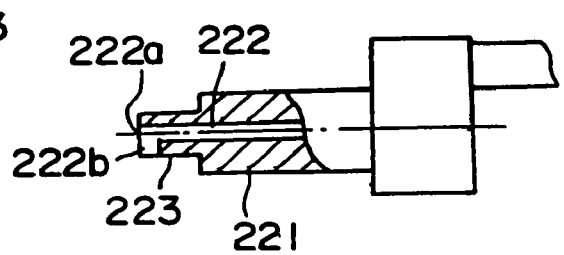
FIG. 11 is a front view showing the first air supply member of the pre-separation device in the third embodiment of the present invention, parts being broken away.

As shown in FIG. 10 and FIG. 11, the nozzle 223 has an opening 222a at the front end thereof and an opening 222b formed in the end face for communicating the through hole 222 and the side of the nozzle 223.

The cylindrical body 221 is provided with a cylindrical portion 226 at the rear end of the cylindrical body 221. The cylindrical portion 226 holds an engaging end 227a at an end of a piston rod 227 of a cylinder $C_2$ so as to communicate the first air supply member 220 and the cylinder $C_2$. In the cylindrical portion 226, a spring 228 is disposed between the cylindrical body 221 and the engaging end 227a and acts as an absorber when the nozzle 223 is inserted into the air suction hole 210.

The second air supply member 230 has a cylindrical block 231 provided with a through hole 232 wherein the through hole 232 is bent in such a manner as to have a horizontal portion and a vertical portion.

The block 231 has an engaging portion 233 formed at the lower end thereof which engages the neck 204 of the container A and presses the upper end of the container A so as to prevent the leakage of air. An opening 232a of the through hole 232 is formed in the center of the engaging portion 233.

The block 231 has a mounting portion 234 at the side thereof, the mounting portion 234 being provided with an internal thread 235 into which an air supply pipe is screwed.

Figure 8:
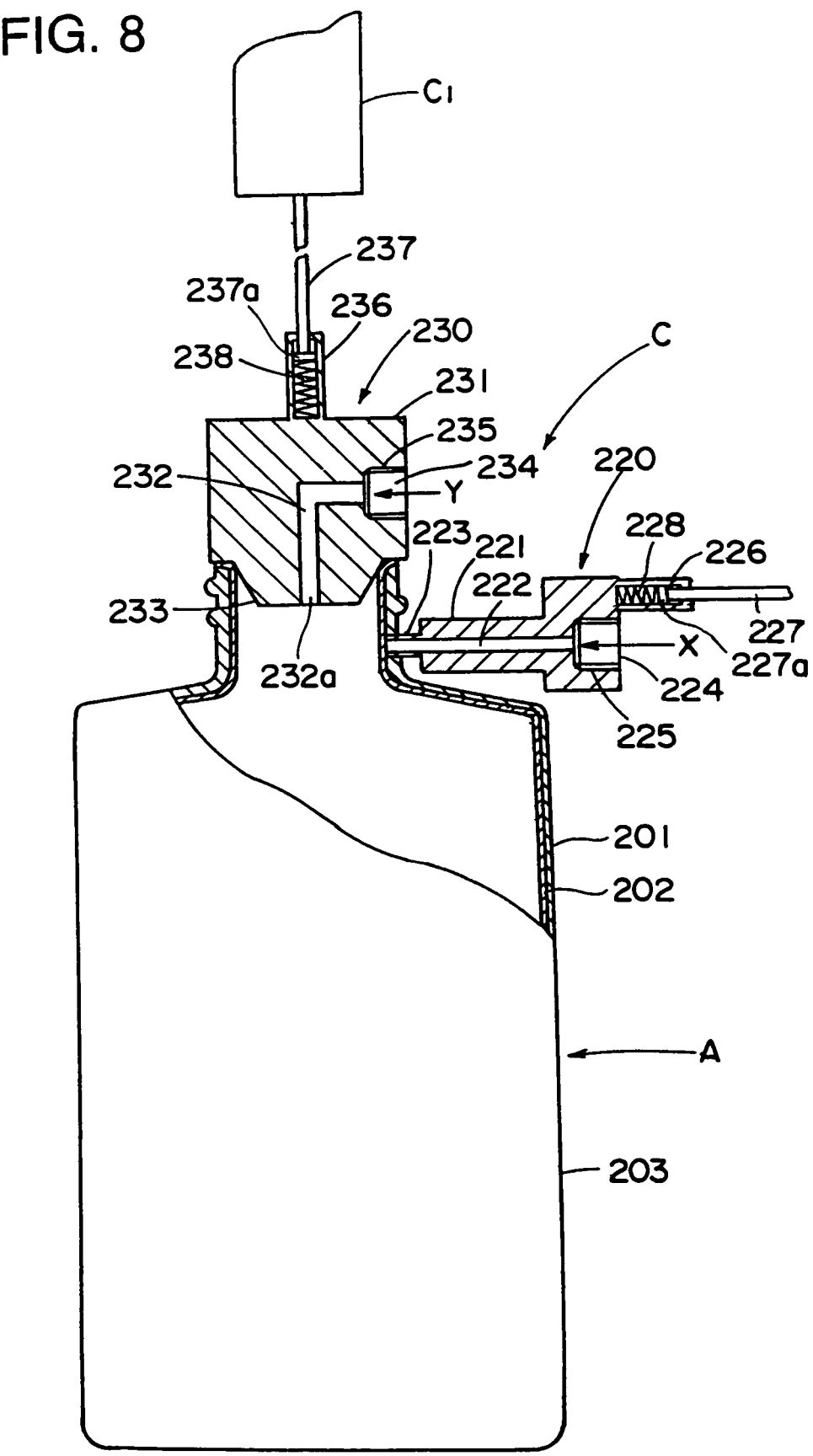
FIG. 8 is a longitudinal sectional view of a pre-separation device according to the third embodiment of the present invention.
Figure 9:
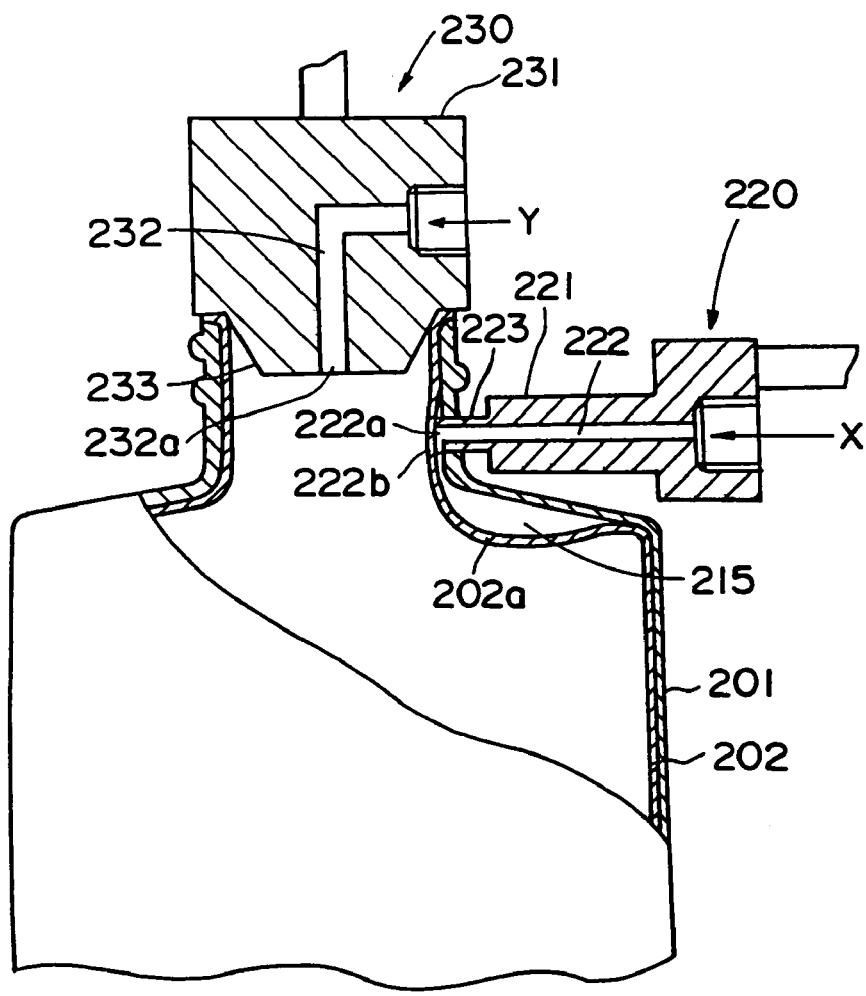
FIG. 9 is an enlarged longitudinal sectional view showing components of the pre-separation device in the third embodiment of the present invention.
Figure 12:
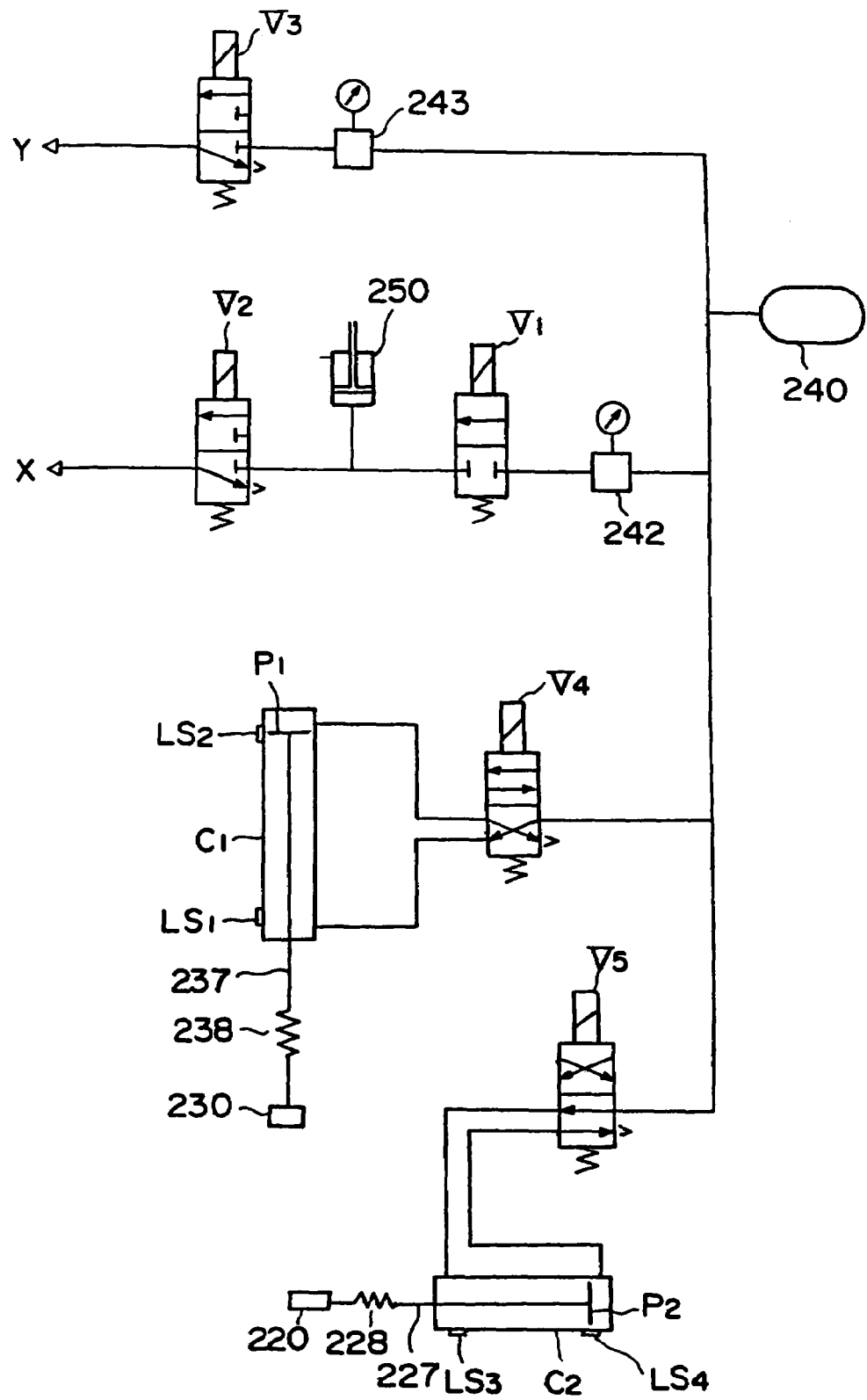
FIG. 12 is a pneumatic piping drawing of the pre-separation device in the third embodiment of the present invention.

The block 231 is provided with a cylindrical portion 236 on the upper face thereof. The cylindrical portion 236 holds the engaging end 237a at the end of the piston rod 237 of the cylinder $C_1$ and connects the second air supply member 230 and the cylinder $C_1$. In the cylindrical portion 236, a spring 238 is disposed between the block 231 and the engaging end 237a and presses the engaging portion 233 of the block 231 to the neck 204 of the container A with a constant biasing force at the lower position of the piston rod 237, as well as acting as an absorber. In FIG. 8, FIG. 9, and FIG. 12, X, Y stand for the air supplying directions.

With reference to FIG. 12, the description will now be made as regard for an air supply system.

The cylinder C, for reciprocating the second air supply member 230 up and down comprises a cylinder member and a piston $P_1$. The end of the piston rod 237 extending from the piston $P_1$ is connected to the second air supply member 230 through the spring 238. The cylinder member of the cylinder $C_1$ is provided with limit switches $LS_1$, $LS_2$ for detecting the lower position and the upper position of the piston $P_1$.

The cylinder $C_1$ is connected to an isopiestic air tank (pressurized air supplier) 240 through a 4-port solenoid valve $V_4$ for operation. The air tank 240 supplies air to either one of two inlets of the cylinder $C_1$ corresponding to ON/OFF of the solenoid valve $V_4$.

The cylinder $C_2$ for horizontally reciprocating the first air supply member 220 comprises a cylinder member and a piston $P_2$. The end of the piston rod 227 extending from the piston $P_2$ is connected to the first air supply member 220 through the spring 228. The cylinder member of the cylinder $C_2$ is provided with limit switches $LS_3$, $LS_4$ for detecting the forward position and the backward position of the piston $P_2$.

The cylinder $C_2$ is connected to the air tank 240 through 4-port solenoid valve $V_5$ for operation. The air tank 240 supplies air to either one of two inlets of the cylinder $C_2$ corresponding to ON/OFF of the solenoid valve $V_5$.

The first air supply member 220 is connected to the isopiestic air tank 240 through a pressure reducing valve 242, 2-port solenoid valve $V_1$, a volume controller 250, and 3-port solenoid valve $V_2$.

When the solenoid valve $V_1$ is turned on, air depressurized to a predetermined pressure by the pressure reducing valve 242 is introduced from the air tank 240 to the volume controller 250. When the solenoid valve $V_1$ is turned off and the solenoid valve $V_2$ is turned on, the air introduced into the volume controller 250 is supplied to the first air supply member 220.

The second air supply member 230 is connected to the air tank 240 through a pressure reducing valve 243 and the 3-port solenoid valve $V_3$.

When the solenoid valve $V_3$ is turned on, air depressurized to a predetermined pressure by the pressure reducing valve 243 is introduced from the air tank 240 to the second air supply member 230.

Figure 13:
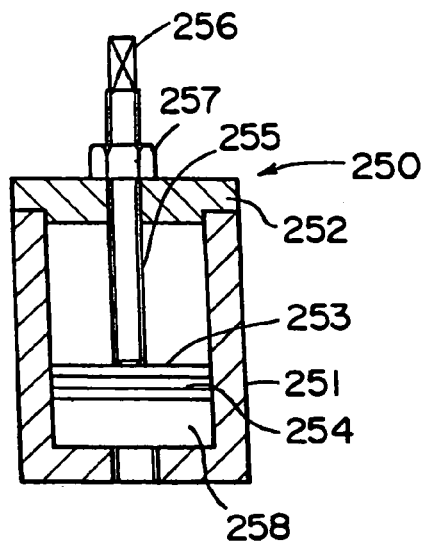
FIG. 13 is a longitudinal sectional view of a volume controller of the pre-separation device in the third embodiment of the present invention.

The volume controller 250 comprises, as shown in FIG. 13, a cylinder 251, a lid 252 of the cylinder 251, a plate-like flow setting member 253, a ring-like sealing member 254 fixed to the flow setting member 253, a positioning screw 255 screwed to an internal thread formed in the lid 252 and having an end connected to the flow setting member 253, a knob-mounting end 256, and a lock nut 257. There is a pressurized air storage 258 formed between a bottom wall of the cylinder 251 and the flow setting member 253.

As mentioned above, the air in the predetermined pressure is introduced into the pressurized air storage 258 of the volume controller 250 and a pipe line corresponding to ON/OFF of the solenoid valves $V_1$, $V_2$ and then introduced, as pre-separating air, between the outer layer 201 and the inner layer 202 of the container A through the first air supply member 220.

Though the volume of the pre-separating air depends on the volume of the container A, the pre-separating air between 1 cc and 3 cc may be enough. Therefore, a small volume controller may be enough as the volume controller 250.

The volume of air is controlled by turning the knob-mounting end 256 of the positioning screw 255 to control the position of the flow setting member 253. Since a separated area 215 made by the pre-separation as shown in FIG. 9 is disposed in a small range between the neck 204 and the shoulder of the container A, it is not necessary to control the size of the separated area 215 depending on the volume of the container A. Once the separated area 215 is set to a predetermined size, it is not necessary to change the size even with containers A of somewhat different volumes.

Hereinafter, the pre-separation device C will be described.

The pre-separation device C is provided with an electric controller (not shown) as control means for controlling the opening and closing of the respective solenoid valves $V_1$ through $V_5$. The controller includes two timers $T_1$, $T_2$ inside thereof and inputs a positional signal S1 for detecting that the container A carried by a conveyer is held in a predetermined position and outputs an operational signal S2 for commanding to carry out the container A when the pre-separation is completed.

Figure 14:
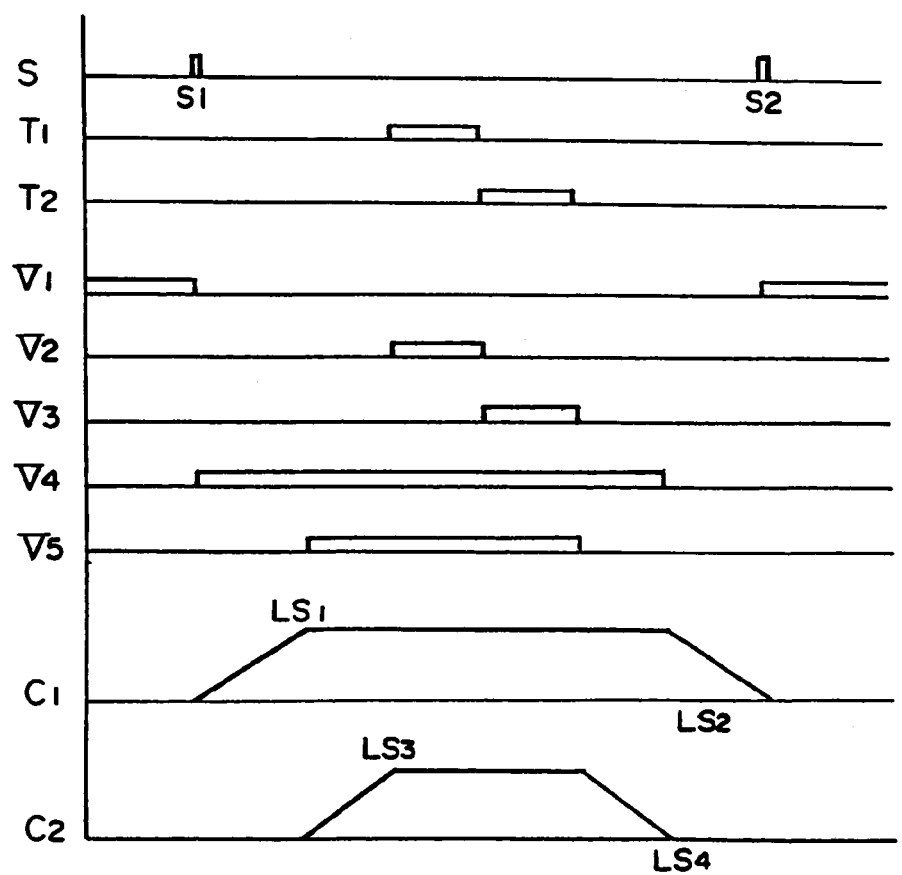
FIG. 14 is a timing chart of the pre-separation device in the third embodiment of the present invention.

With reference to the timing chart of FIG. 14, the operation and the pre-separation method of the pre-separation device C will be described.

As a power source is turned on, the solenoid valve $V_1$ is also turned on so that the depressurized air is introduced into the volume controller 250 so that a fixed volume of air at a fixed pressure is stored.

As the positioning signal S1 is then inputted, the solenoid valve $V_1$ is turned off, the solenoid valve $V_4$ is turned on, the piston $P_1$ of the cylinder $C_1$ moves down to the stroke end where the second air supply member 230 engages and presses the neck 204 of the container A and the limit switch $LS_1$ is turned on.

The turning-on of the limit switch $LS_1$ turns on the solenoid valve $V_5$ so as to move the piston $P_2$ of the cylinder $C_2$ forward to the stroke end where the nozzle 223 of the first air supply member 220 is inserted into the air suction hole 210 of the neck 204 so that the inner layer 202 is pressed by the distal end of the nozzle 223 and thus separated from the outer layer 1 and the limit switch $LS_3$ is turned on.

The turning-on of the limit switch $LS_3$ turns on the solenoid valve $V_2$ and the timer $T_1$ so that the air stored in the volume controller 250 is introduced between the outer layer 201 and the inner layer 202 through the openings 222a, 222b of the nozzle 223 of the first air supply member 220 so as to separate a part of the inner layer 202 to form the separated area 215. At this point, the distal end of the nozzle 223 moves forward according to the separation of the inner layer 202 around the air suction hole 210 in such a manner that the opening 222b on its side is completely communicated with the separated area 215 as shown in FIG. 9.

As the timer $T_1$ times out, the solenoid valve $V_2$ is turned off and the solenoid valve and the timer $T_2$ are turned on so that the air at the fixed pressure is blown into the container A from the second air supply member 230, the air previously introduced into the separated area 215 is discharged from the opening 222b on the side of the nozzle 223 through the first air supply member 220, and the end of the nozzle 223 is eventually moved backward to the outer layer 201 to completely return the inner layer 202 to the original state.

As the timer $T_2$ times out, the solenoid valve $V_3$ and the solenoid valve $V_5$ are turned off so as to stop the blowing of the air by the second air supply member 230, move the piston $P_2$ of the cylinder $C_2$ backward and move the first air supply member 220 backward.

When the piston $P_2$ of the cylinder $C_2$ is moved backward to the stroke end, the limit switch $LS_4$ is turned on and the solenoid valve $V_4$ is thus turned off so as to move the piston $P_1$ of the cylinder $C_1$ upward and move the second air supply member 230 upward.

When the piston $P_1$ reaches the upper position of the stroke end, the limit switch $LS_2$ is turned on so as to turn on the solenoid valve $V_1$ and output the operational signal S2 to carry out the container A from the position for the pre-separation.

As stated above, the container A with the air suction hole 210 is held in the position for the pre-separation, after that, the pre-separating air is introduced between the outer layer 201 and the inner layer 202 through the air suction hole 210 by the first air supply member 220, and then the air is blown into the container A through the neck 204 by the second air supply member 220 so as to discharge the pre-separating air previously introduced to return the inner layer 202 to the original state. In this manner, the pre-separation is finished.

In the separable laminated container A of this embodiment, since the synthetic resin having flexural modules of less than 10,000 $kg/cm^2$ is employed as the material of the inner layer 202, the inner layer 202 separated from the outer layer 201 smoothly shrinks according to the decrease of the liquid content when the separable laminated container A is in use.

In addition, by previously separating only a part of the inner layer 202 around the air suction hole 210 from the outer layer 201, the air is smoothly introduced between the outer layer 201 and the inner layer 202 even in the initial stage of pouring out the liquid content when the separable container is in use, thereby facilitating the separation of the inner layer 202. Since only a part of the inner layer 202 is separated in the pre-separation, a small amount of pre-separating air is enough. In addition, it is not necessary to control the volume of the air even with separable laminated containers A of somewhat different volumes so that the operation is easy.

Though the air suction hole 210 is formed in the neck 204 in the separable laminated container A of this embodiment, the air suction hole 210 may be formed in the drum portion 203. Though the air suction hole 210 is punched by the punching means, the air suction hole 210 may be punched by welding means.

[Fourth Embodiment]

Figure 15:
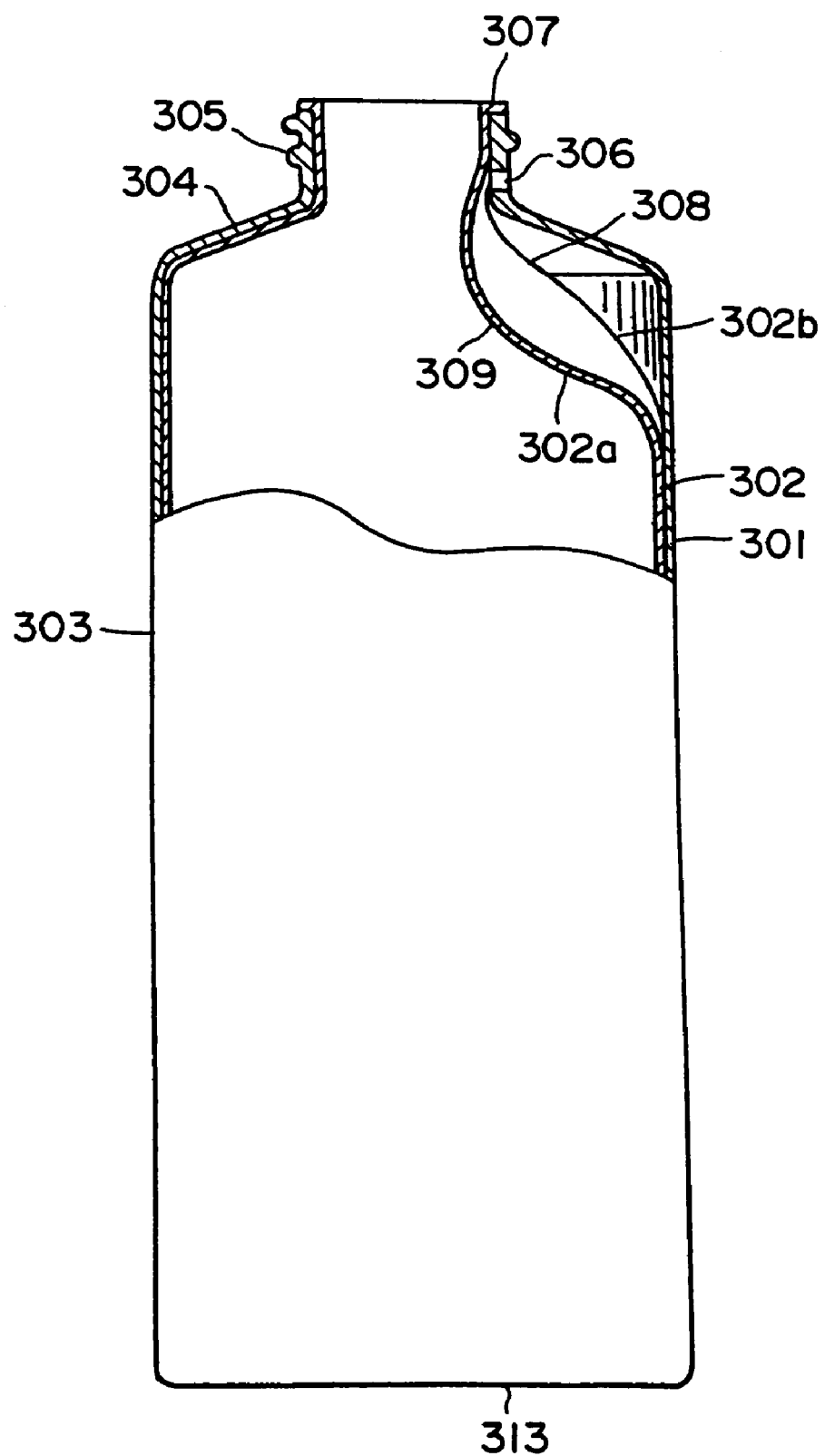
FIG. 15 is a front view of showing a separable laminated container according to a fourth embodiment of the present invention, parts being broken away.
Figure 16:
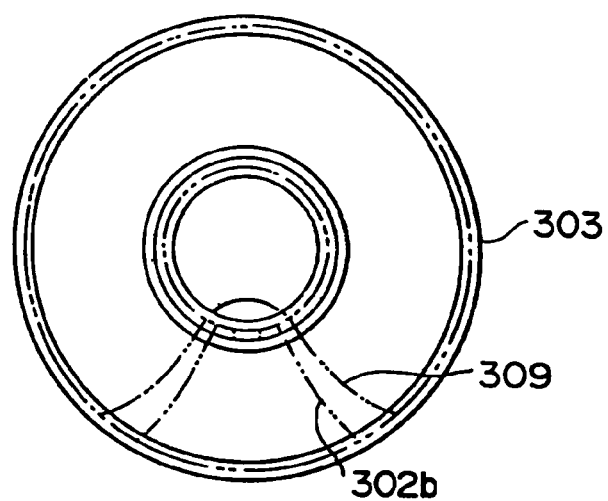
FIG. 16 is a plan view of the separable laminated container according to the fourth embodiment of the present invention.
Figure 17:
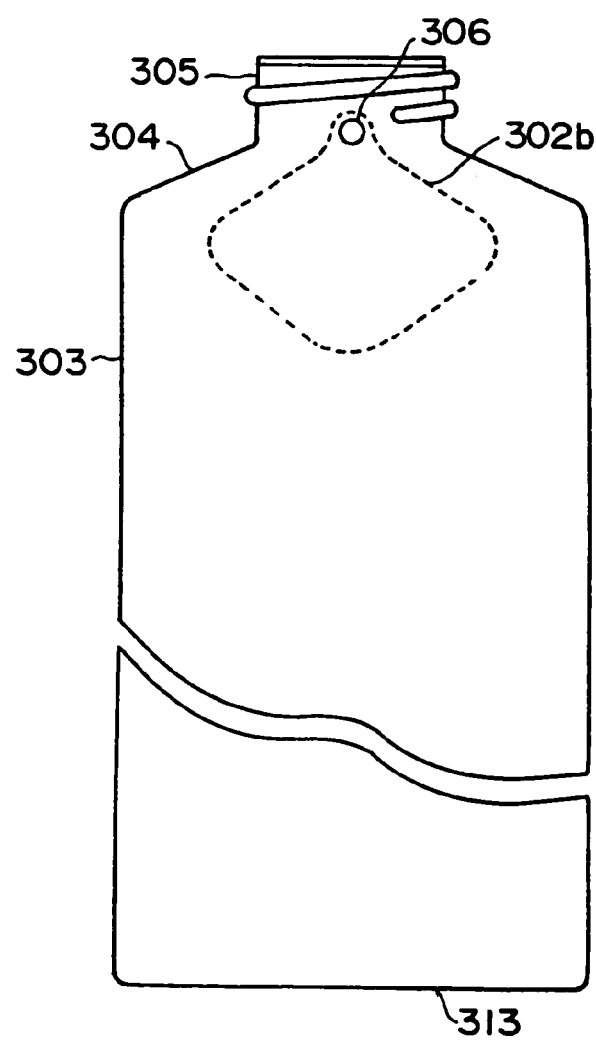
FIG. 17 is a right side view of the separable laminated container according to the fourth embodiment of the present invention.

FIG. 15 is a front view of showing a separable laminated container A according to a fourth embodiment wherein parts being broken away, FIG. 16 is a plan view of the same, and FIG. 17 is a side view of the same.

The separable laminated container A is made up of an outer layer 301 and an inner layer 302 and comprises a drum portion 303, a shoulder 304, a neck 305, and a bottom 313.

The outer layer 301 is made of high-density polyethylene to keep the profile of the container A.

The inner layer 302 is an inner bag which is separable from the outer layer and deformable and is made of flexible resin such as nylon or EVOH (ethylene-acetic acid vinyl copolymer emulsion).

It should be understood that the materials of the outer layer 301 and the inner layer 302 are not limited to the resin of this embodiment so that the materials may be any resin having the aforementioned characteristics.

The outer layer 301 and the inner layer 302 of the container A are made by blow molding of a laminated parison which is formed by co-extrusion.

The neck 305 is provided with an air suction hole 306 punched in the outer layer 301. The air suction hole 306 is a hole for introducing the atmospheric air into a space between the outer layer 301 and the inner layer 302 in order to smoothly achieve the separation of the inner layer 302 with keeping the profile of the container A to completely pour out the liquid content. The air suction hole 306 may be punched by using the punching device of the aforementioned first embodiment.

The neck 305 is provided with an engaging portion 307 formed at an upper end of inner layer 202 by a mandrel of an air blowing device during the blow molding, thereby preventing the dip of the inner layer 302. It should be noted that the engaging portion 307 is not necessary when the outer layer 301 and the inner layer 302 are partly bonded each other.

The inner layer 302 has an expanded portion 309 separated from the outer layer 301 and projecting inwardly which is formed close to the air suction hole 306 by air blown for a pre-separation so that, next to the extended portion 309, there is a space 308 formed between the outer layer 301 and the inner layer 302

As for the pre-separation, the pre-separation is made before filling the liquid content into the container A.

Figure 18:
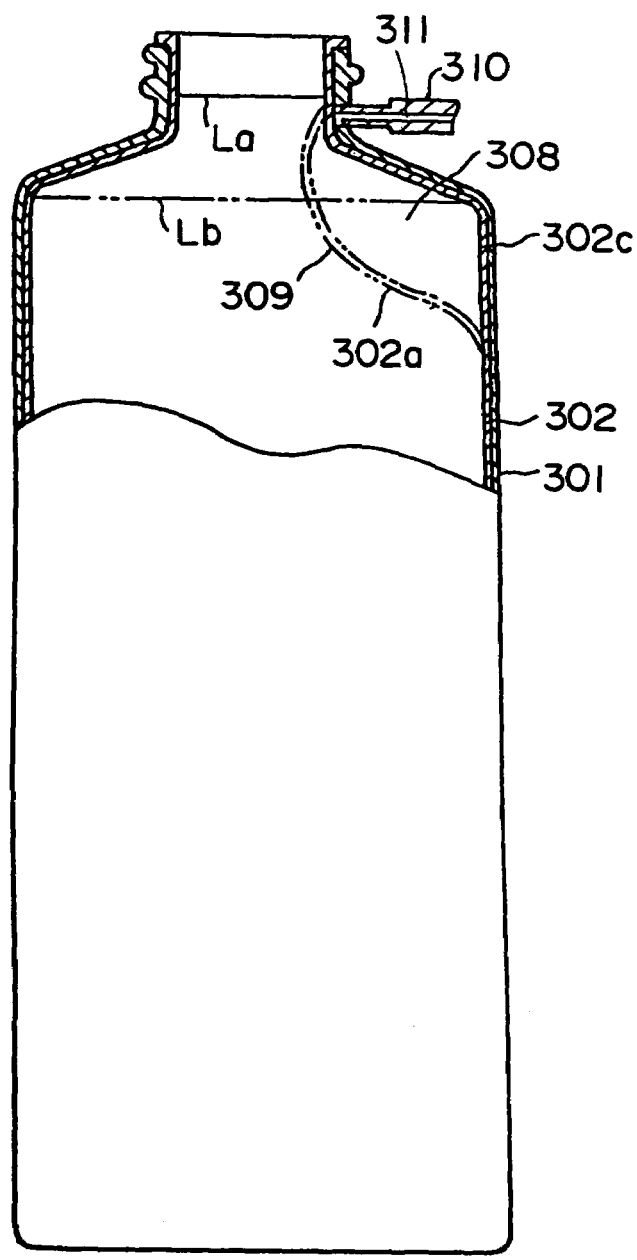
FIG. 18 is a front view showing the separable laminated container according to the fourth embodiment of the present invention during pre-separation, parts being broken away.
Figure 19:
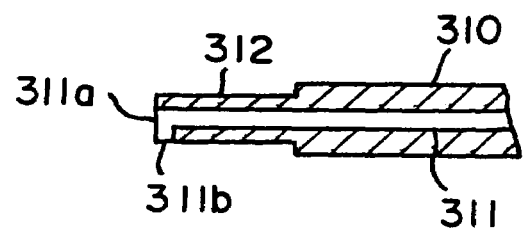
FIG. 19 is a longitudinal sectional view of a pre-separation device in the fourth embodiment of the present invention.

The pre-separation is made by using a pre-separation device 310 as shown in FIG. 18. As shown in FIG. 19, the pre-separation device 310 is provided with a through hole 311 inside thereof and a nozzle 312 at the front end thereof.

The nozzle 312 is provided with an opening 311a at the front end thereof and an opening 311b communicating with the side of the nozzle 312 wherein air is blown downward from the opening 311b.

In the pre-separation, the nozzle 312 of the pre-separation device 310 is inserted into the air suction hole 306 of the neck 305 and a fixed amount of pre-separating air is blown so that the separation of the inner layer 302 starts from a portion around the neck 305 and then travels to the shoulder 304 and an upper portion of the drum portion 303 until a portion of the inner layer 302 surrounded by the line 302b as shown in FIG. 16 and FIG. 17 is separated from the outer layer 301, thereby forming the extended portion 309.

In the pre-separation, the extended portion 309 is formed by blowing such an amount of air as to extend the separated inner layer 302a at least to the inside of the neck 305.

After the inner layer is separated from the outer layer, while the separated inner layer is returned to the original state to come in contact with the outer layer by blowing air into the container A through the neck to discharge the pre-separating air in the third embodiment mentioned above, the extended portion 309 of the separated inner layer 302a is held in this state in this fourth embodiment.

After the pre-separation, it is checked whether the pre-separation was securely made or not by observing the extended portion 309 from an upper position over the neck 305 with a telecamera or the like. Then, the container A is carried out.

The description will now be made as regard to the filling of the liquid content into the container A.

The upper space in the container A filled with the liquid content is generally dependent on the volume of the container A and the amount of the filled liquid content. When a fixed amount of liquid content is filled into the container A having such an extended portion 309 as this embodiment, however, the upper space after filling is reduced according to the size of the extended portion 309 so that the level La of the liquid content at this point is risen by the volume excluded by the extended portion 309 as compared with the level Lb in case of no extended portion 309 as shown in FIG. 18.

Since the hydraulic pressure at the extended portion 309 is quite small and the inner layer 302 has somewhat form retentivity even when the inner layer is flexible, little amount of the pre-separating air is discharged even after filling the liquid content so that the form of the extended portion 309 is substantially kept even after filling the liquid content.

When a cap is fitted to the neck 305, the level La is kept constant because no air is entered into the container A so that no pre-separating air is discharged.

According to this embodiment, the upper space in the container A and the level of the liquid content after filling the liquid content can be controlled by the size of the extended portion 309 or the volume of the space 308. Therefore, the level of the liquid content can be easily risen to near the neck 305 even with the same amount of liquid content by controlling the volume of the pre-separating air.

The same is true for the container A with large volume. Conventionally, in case of the container A with large volume, the level of the liquid content is lowered below the neck 305 or to the lower portion of the shoulder and near the upper end of the drum portion 303 so as to make the upper space after filling the liquid content wider so that the water face of the liquid content waves, thereby bubbling the liquid content during the container is transported. In case of the container A with the extended portion 309 of this embodiment, however, the level of the liquid content can be risen to the neck 305 by setting the extended portion 309 to a predetermined size, thereby decreasing the waves of the water face of the liquid content and the swing of the liquid content during the container A is transported.

In addition, as the upper space after filling the liquid content is small, this gives a consumer the impression of fulfillment when the consumer has the container A in his/her hand.

Further, the step for blowing air into the container A in order to discharge the pre-separating air is not necessary in the pre-separation process, thereby facilitating the manufacturing process.

Furthermore, the inner layer 302 and the outer layer 301 are not connected by blowing the air into the container A, thereby improving the separability of the inner layer 302 when the container A is in use.

Moreover, the state of the pre-separation can be inspected just by observing the inside of the container A from the upper side of the neck 305 of the container A.

[Fifth Embodiment]

Figure 20:
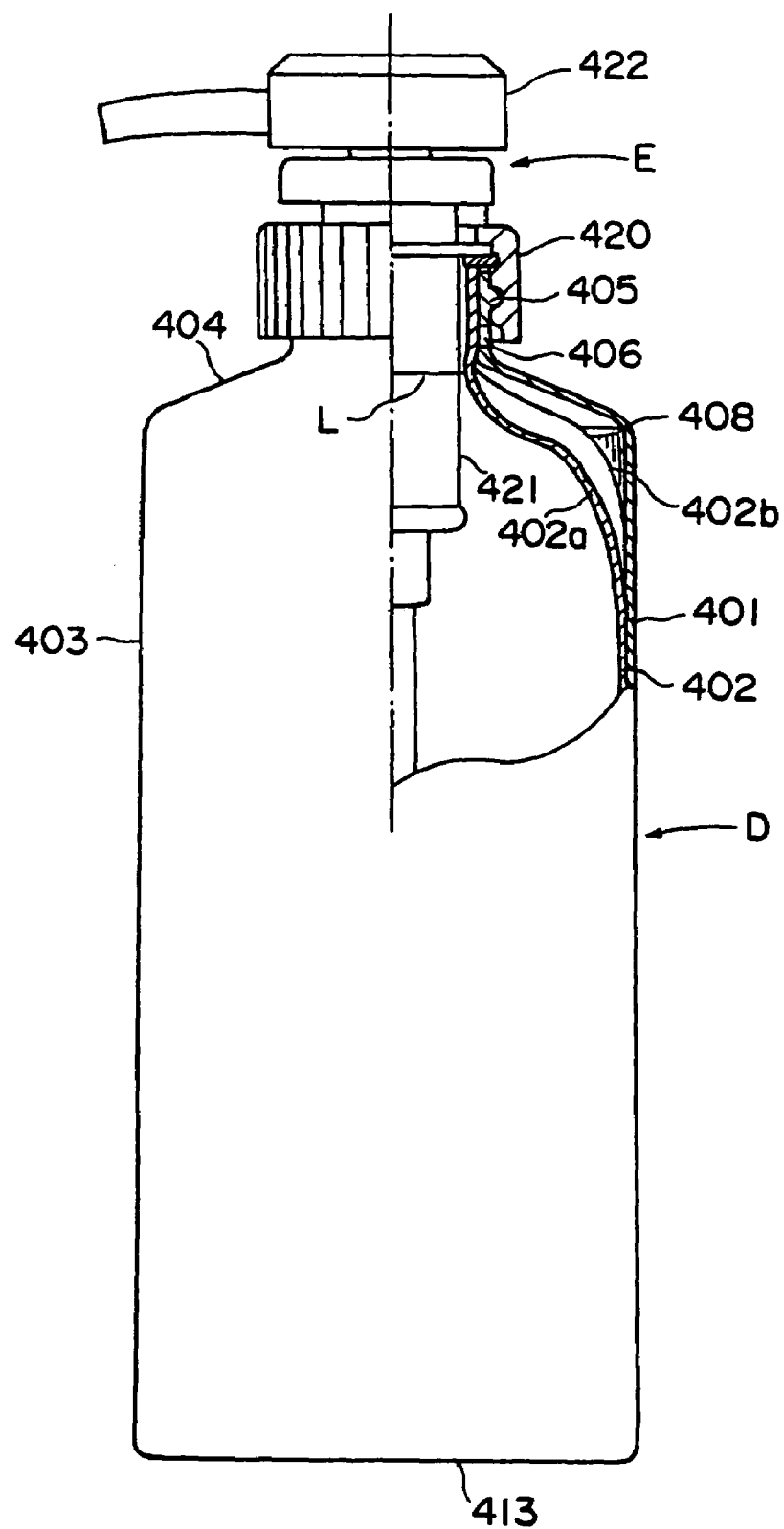
FIG. 20 is a front view showing a container with pump according to a fifth embodiment of the present invention, parts being broken away.

FIG. 20 is a front view showing a container with pump according to a fifth embodiment wherein parts being broken away. The container with pump comprises a container body (separable laminated container) D made up of an outer layer 401 and an inner layer 402, and a pump E fitted to the container body D.

Figure 23:
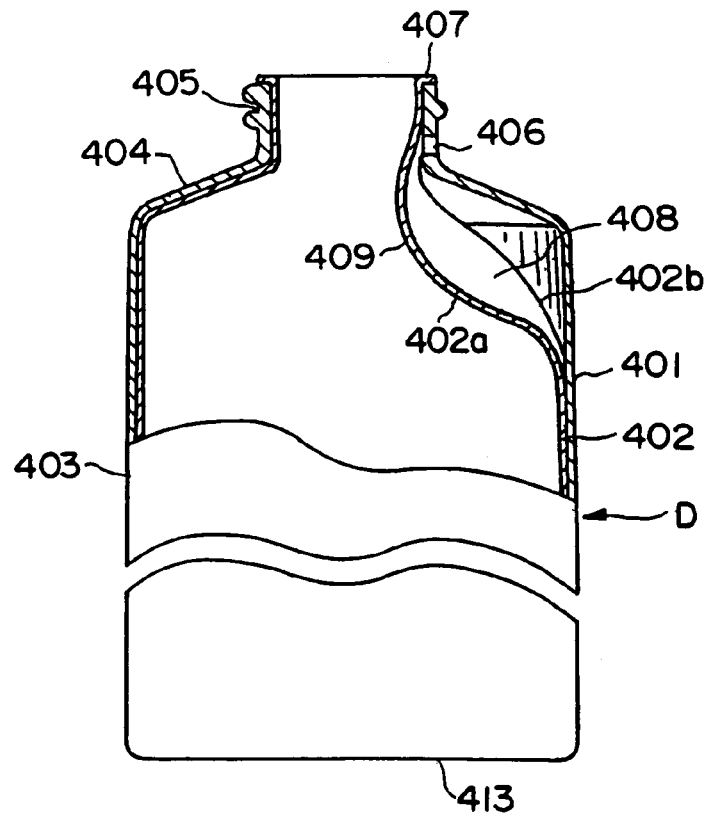
FIG. 23 is a front view showing the container body of the container with pump during the pre-separation in the fifth embodiment of the present invention, parts being broken away.
Figure 24:
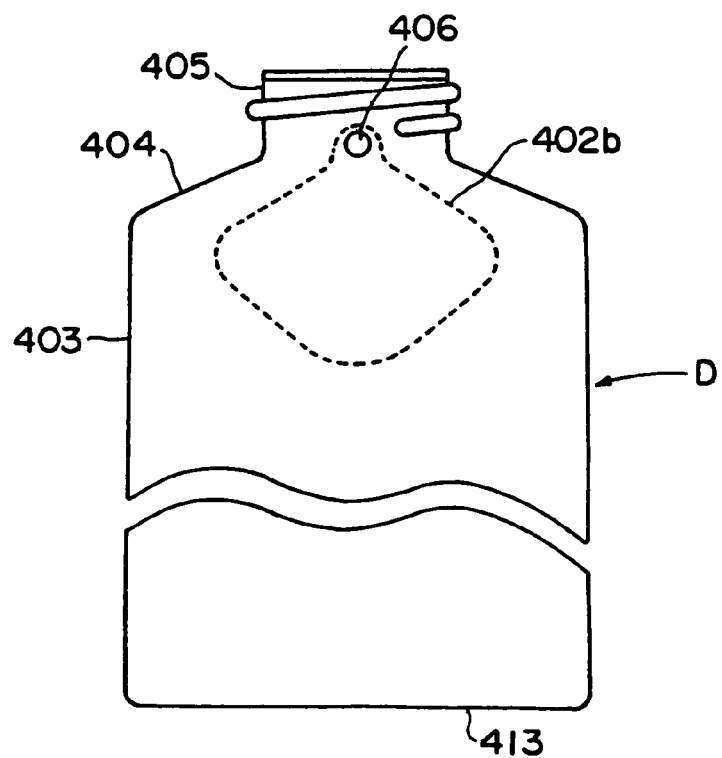
FIG. 24 is a right side view showing the container body of the container with pump during the pre-separation in the fifth embodiment of the present invention.

First, the container body D will be described. As shown in FIG. 23 and FIG. 24, the container body D comprises a drum portion 403, a shoulder 404, a neck 405, and a bottom 413.

The outer layer 401 is made of high-density polyethylene to keep the profile of the container body D.

The inner layer 402 is an inner bag which is separable from the outer layer 401 and deformable and is made of flexible resin such as nylon or EVOH (ethylene-acetic acid vinyl copolymer emulsion).

It should be understood that the materials of the outer layer 401 and the inner layer 402 are not limited to the resin of this embodiment so that the materials may be any resin having the aforementioned characteristics.

The outer layer 401 and the inner layer 402 of the container body D are made by blow molding of a laminated parison which is formed by co-extrusion.

The neck 405 is provided with an air suction hole 406 punched in the outer layer 401. The air suction hole 406 is a hole for introducing the atmospheric air into a space between the outer layer 401 and the inner layer 402 in order to smoothly achieve the separation of the inner layer 402 with keeping the profile of the container body D to completely pour out the liquid content. The air suction hole 406 may be punched by using the punching device of the aforementioned first embodiment.

The neck 405 is provided with an engaging portion 407 formed at an upper end of inner layer 402 by a mandrel of an air blowing device during the blow molding, thereby preventing the dip of the inner layer 402. It should be noted that the engaging portion 407 is not necessary when the outer layer 401 and the inner layer 402 are partly bonded each other.

The inner layer 402 has an expanded portion 409 separated from the outer layer 401. The expanded portion projects inwardly and is formed close to the air suction hole 406 by air blown for a pre-separation. Thus, next to the extended portion 409, a space 408 forms between the outer layer 401 and the inner layer 402.

As for the pre-separation, the pre-separation is made before filling the liquid content into the container body D.

Figure 21:
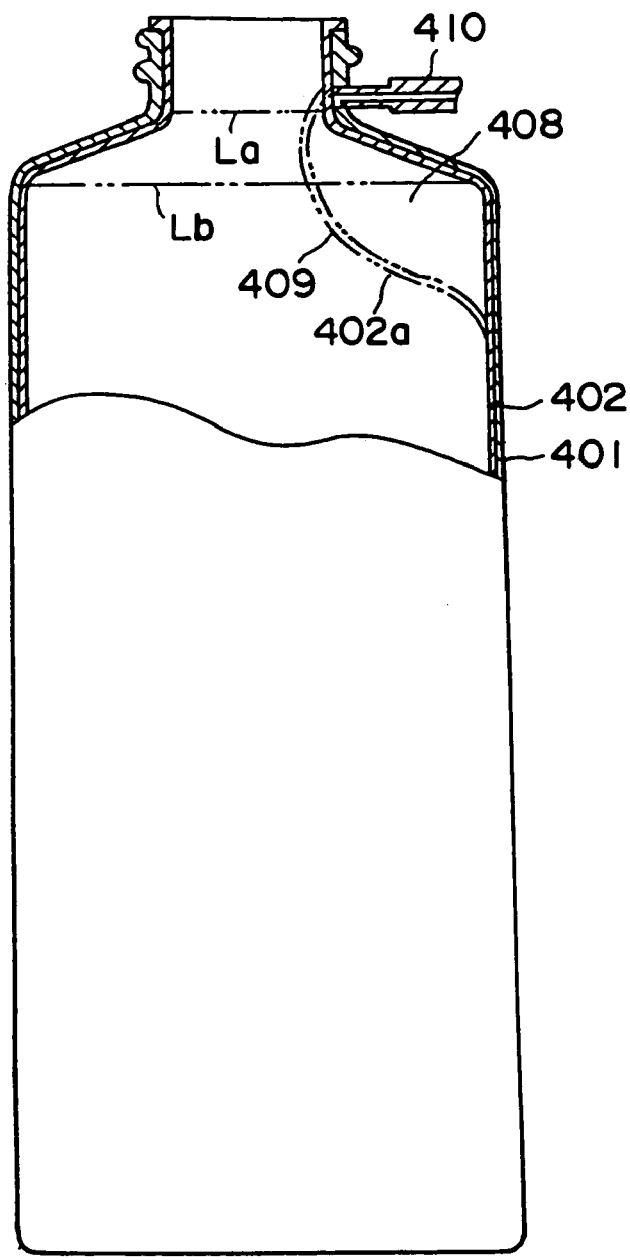
FIG. 21 is a front view showing a container body of the container with pump in the fifth embodiment of the present invention parts being broken away.
Figure 22:
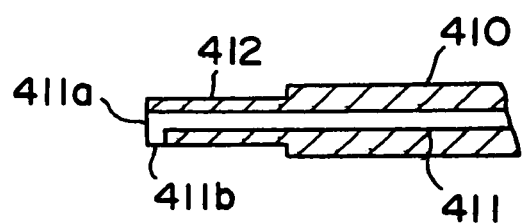
FIG. 22 is a longitudinal sectional view of a pre-separation device in the fifth embodiment of the present invention.

The pre-separation is made by using a pre-separation device 410 as shown in FIG. 21. As shown in FIG. 22, the pre-separation device 410 is provided with a through hole 411 inside thereof and a nozzle 412 at the front end thereof.

The nozzle 412 is provided with an opening 411a at the front end thereof and an opening 411b communicating with the side of the nozzle 412 wherein air is blown downward from the opening 411b.

In the pre-separation, the nozzle 412 of the pre-separation device 410 is inserted into the air suction hole 406 of the neck 405 and a fixed amount of pre-separating air is blown so that the separation of the inner layer 402 starts from a portion around the neck 405 and then travels to the shoulder 404 and an upper portion of the drum portion 403 until a portion of the inner layer 402 surrounded by the line 402b as shown in FIG. 23 and FIG. 24 is separated from the outer layer 401, thereby forming the extended portion 409.

The pre-separation device 410 is connected to an air supplying device with a volume controller which facilitates the control of the amount of the supplied pre-separating air in a fixed range.

In this embodiment, the neck 405 is provided with the air suction hole 406 punched in the outer layer 401 so that the air suction hole 406 is covered by a cap 420 of the pump E when the pump E is fitted to the container body D. However, the air suction hole 406 may be formed in an upper end of the shoulder 404, or any suitable portion of the shoulder 404 or drum portion 403.

After the inner layer is separated from the outer layer, while the separated inner layer is returned to the original state to come in contact with the outer layer by blowing air into the container body D through the neck to discharge the pre-separating air in the third embodiment mentioned above, the extended portion 409 of the separated inner layer 402a is held in this state in this fifth embodiment.

When a fixed amount of liquid content is filled into the container body D, the upper space after filling is reduced according to the size of the extended portion 409 so that the level La of the liquid content at this point is risen by the volume excluded by the extended portion 409 as compared with the level Lb in case of no extended portion 409 as shown in FIG. 21.

Since the hydraulic pressure at the extended portion 409 is quite small and the inner layer 402 has somewhat form-retentivity even when the inner layer is flexible, little amount of the pre-separating air is discharged even after filling the liquid content so that the form of the extended portion 409 is substantially kept even after filling the liquid content.

The pump E is fitted to the container body D filled with the liquid content as mentioned above. The description will be first made as regard to the pump E with reference of FIG. 20 and FIG. 26.

The pump E comprises the cap 420, a cylinder 421 provided with a piston and a valve mechanism inside thereof, and an operational member 422 for the piston.

The cylinder 421 is provided with a lid 423, having a through hole into which a piston rod is inserted, at the upper end thereof and a mounting flange 424 around an upper portion thereof.

The cylinder 421 is provided with a flange-like seal 425 extended outwardly at the lower end thereof. The seal 425 comes in contact with the inner circumference 405a of the neck 405 of the container body D tightly during fitting the pump E in order to keep the airtightness with the neck 405.

The cylinder 421 is provided with a valve seat cylinder 426 extending from a lower portion of the cylinder 421 and a suction pipe 427 extending downward from the valve seat cylinder 426. The operational member 422 is provided with a discharge pipe 428 extending therefrom for discharging the liquid content.

Since the internal structure of the pump E is well known in the art, the detailed description with reference to the drawings will be omitted. The piston reciprocates up and down by pushing operation of the operational member 422 and the restoring force of a compressed spring disposed in the cylinder 421 so as to discharge a fixed amount of liquid content according to the operation of the operational member 422.

The piston is held at the lowest position and a valve member disposed in the bottom of the cylinder 421 is fixed to the closed position by rotating the operational member 422 at the lower position to engage the lid 423, thereby preventing the flow of the liquid content between the suction pipe 427 and cylinder 421 for fitting the pump E or when the container is not in use.

The pump E is fitted in the same manner as that of a common container with pump. The cap 420 is fitted to the neck 405 in such a manner as to dispose the mounting flange 424 of the cylinder 421 and a packing 430 between the cap 420 and the neck 405.

Hereinafter, the function of the seal 425 when the pump E is mounted and the level of the liquid content will be described with reference to FIG. 25 and FIG. 26.

Figure 25:
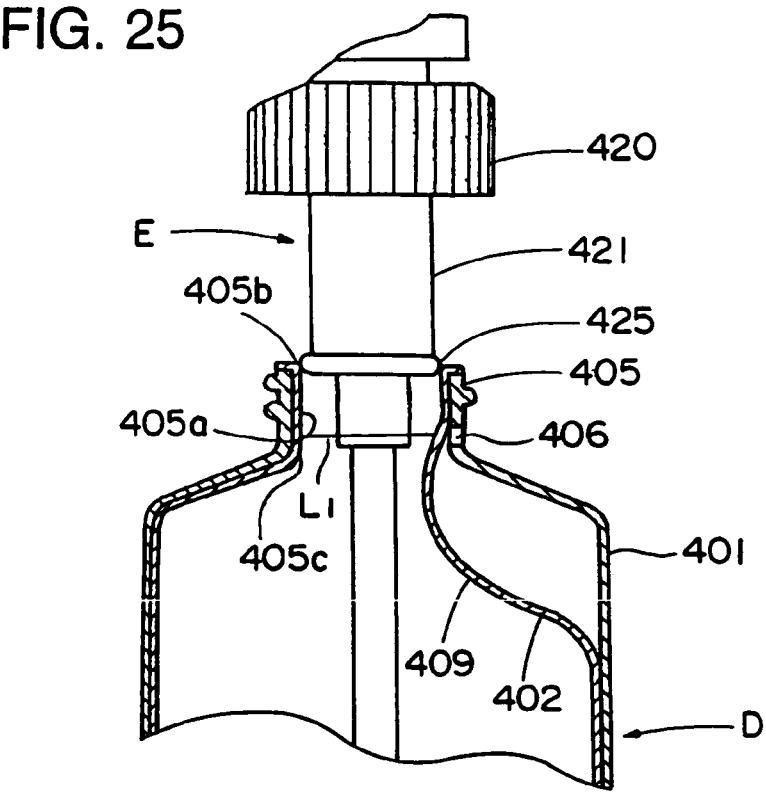
FIG. 25 is a sectional view showing components in the container with pump in an initial stage of installing a pump according to the fifth embodiment of the present invention.
Figure 26:
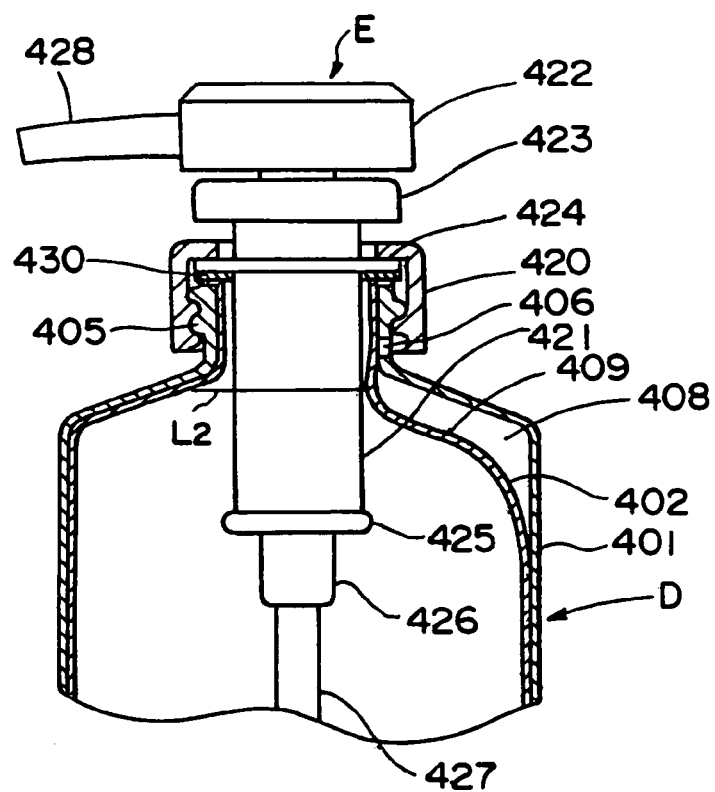
FIG. 26 is a sectional view showing components in the container with pump when the installation of the pump is completed according to the fifth embodiment of the present invention.

FIG. 25 shows a state where the suction pipe 427 and the valve seat cylinder 426 are inserted into the container body D and the seal 425 of the cylinder 421 is in contact with the upper inner edge 405b of the neck 405 to compress the upper edge 405b so that the container body D is sealed. FIG. 26 shows a state where the installation of the pump E is completed.

In the sealed state as shown in FIG. 25, the upper space in the container body D is reduced by the volume of pumping member (the valve seat cylinder 426 and the suction pipe 427) inserted into the container body D as compared with the same before the insertion of the pump and the level L1 is slightly higher than the level La (see FIG. 21) before the insertion by the volume of the suction pipe 427.

As the pump E is pushed downward from the state as shown in FIG. 25, the seal 425 moves downward along the inner circumference 405a of the neck 405 so as to discharge the pre-separating air in the space 408 and make the level lower until reaching a position corresponding to the air suction hole 406.

Once the seal 425 reaches the position corresponding to the air suction hole 406, the air suction hole 406 is stopped up by the inner layer 402 so as to stop the discharge of the pre-separating air.

After that, the pre-separating air does not discharged and the air in the container body D is just compressed until the seal 425 reaches a lower inner edge 405c of the neck 405.

As the seal 425 moves downward apart from the lower edge 405c, the airtightness of the container body D is released and the compressed air in the container body D is discharged through a space between the cylinder 421 and the neck 405.

When the air suction hole 406 is formed in any other place than the neck 405, the pre-separating air in the space 408 is discharged according to the descent of the pump E until the seal 425 reaches the lower edge 405c. As the seal 425 moves downward apart from the lower edge 405c, the airtightness of the container body D is released, and the discharge of the pre-separating air is stopped.

As the pump E is further pushed downward after the seal 425 reaches the lower edge 405c of the neck 405, the level of the liquid content is risen by the volume of the cylinder 421 submerged into the liquid content and becomes the level L2 when the cap 420 is fitted to the neck 405.

Since the container body D is tightly sealed after the installation of the pump, the pre-separating air is no longer discharged and the upper space in the container body D and the level of the liquid content are kept constant.

The description will now be made as regard to the relation between the upper space in the container body D and the volume of pre-separating air.

Assuming that Qa is the initial volume of the pre-separating air filled into the space 408 during the pre-separation before the installation of the pump, Qb is the volume of the air discharged from the space 408 during the installation of the pump, and Qc is the volume of residual air remaining in the space 408 after the installation of the pump, the following expression holds for the volume of the pre-separating air:

$$Qa=Qb+Qc$$

The initial volume Qa can be controlled by the volume controller of the air supplying device connected to the pre-separation device 410.

The discharged volume Qb is found form the configuration and the dimensions of the container body D.

The air in the container body D, which is sealed during the installation of the pump, is compressed according to the elevation of the cylinder 421. When the air suction hole 406 is not stopped up, the air in the container body D has a pressure equal to the atmospheric pressure because of the deformation of the inner layer 402. Therefore, the compression of the air in this case is negligible.

The discharged volume Qb is given by the following expression:

$$Qb=\pi r^2 h$$

where r is the radius of the inner circumference 405a of the neck 405, and h is the height from the upper edge 405b of the neck 405 to the air suction hole 406.

When the air suction hole 406 is formed in any other place than the neck 405, the discharged volume Qb is given by the following expression:

$$Qb=\pi r^2 ha$$

where r is the radius of the inner circumference 405a of the neck 405, and ha is the height from the upper edge 405b to the lower edge 405c of the neck 405.

At this point, the radius r, the height h, ha are fixed values defined from the design of the container body D so that the discharge amount Qb is a constant value.

The residual volume Qc of the residual air in the space 408 is found from a difference between the initial volume Qa and the discharged volume Qb(Qc=Qa−Qb). Since the Qb is a constant value, the residual volume Qc can be freely set by controlling the initial volume Qa.

The description will now be made as regard to the upper space in the container body D after the installation of the pump. 1

Though it is possible to quantitatively analyze the variation in the upper space and the level of the liquid content, the analyses are complex and the detailed analyses are not necessary. Therefore, the action and effect of this embodiment with regard to the upper space after the installation of the pump will be apparent from comparison between the container of this embodiment and the conventional container.

The volume of the upper space after the installation of the pump is found by subtracting the volume of the filled liquid content and the volume of the pumping member (the cylinder 421, the valve seat cylinder 426, and the suction pipe 427) which are inserted into the container body D from the volume of the container body D.

Letting the volume of the container body without the extended portion 409 or the container body in which the inner layer is returned to the original state is Vo, the volume Vo is a constant value because the volume of the container body and the volume of the liquid content are known and the volume of the pumping member is defined by the configurations of the dimensions thereof.

Letting the volume of the upper space in the container body D with the extended portion 409 is V, the volume V of the upper space of this embodiment is reduced by the residual volume Qc of the pre-separating air in the space 408 because of the extended portion 409 because the volume of the liquid content and the volume of the pumping member inserted into the container body D are the same as those of the conventional container.

Therefore, the volume V of the upper space of this embodiment is found by the following expression:

$$V = Vo - Qc$$
$$= Vo - (Qa - Qb).$$

In the above expression, since Vo is a constant value and Qb is also a constant value, it is found that the volume V of the upper space is variable corresponding to the initial value Qa.

When the volume V of the upper space becomes negative, it means that the content overflows from the neck 405. Therefore, it should be understood that Qa should be set in such a manner as to holding V>0.

The air is just compressed from a point in time when the volume of the air discharged from the space 408 becomes equal to the initial volume Qa while the cylinder 421 descends, to a point in time when the seal 425 reaches the lower edge 405c of the inner surface of the neck 405. Therefore, to set Qa<Qb, the volume of the upper space during inserting the pump should be larger than a value found by subtracting the initial volume Qa from the volume of the neck because the liquid content is incompressible.

The action and effect of this embodiment will be described hereinafter.

Since, as described above, the initial volume Qa is controllable by the volume controller of the air supplying device, the volume of the upper space after the pump E is installed and the level of the liquid content can be easily controlled by controlling Qa.

When the initial volume Qa is set to be equal to the discharged volume Qb, the pre-separating air within the space 408 is completely discharged and the separated portion 402a of the inner layer 402 is returned to the original state so as to bring the separated portion 402a of the inner layer 402 in contact with the outer layer 401.

Therefore, in this case, the inner layer 402 can be returned to the original state during the installation of the pump without blowing air into the container body D through the neck 405 in the pre-separation process after the pre-separating air is introduced between the outer layer 401 and the inner layer 402.

As the initial volume Qa increases, the residual volume Qc of the air remaining in the space 408 increases, and the upper space reduces and the level of the liquid content rises as compared with a case where the separated portion 402a of the inner layer 402 is returned in the original state.

By setting the initial volume Qa into a predetermined value, the level can be positioned in the neck 405 when the volume V of the upper space is set to be equal to or less than the value found by subtracting the volume of the cylinder 421 of the pump E inserted in the neck 405 from the volume of the neck 405.

Therefore, even with the container with pump of which the volume of the container body D is large so that the upper space is large and the level of the liquid content is lowered to the lower portion of the shoulder 404, the level of the liquid content can be easily risen to the neck 405 after the installation of the pump, thereby decreasing the waves of the water face of the liquid content and the swing of the liquid content during the container body D is transported and thus preventing the bubbling and the generation of gases.

[Sixth Embodiment]

With reference to FIG. 27 through FIG. 29, a container with pump according to a sixth embodiment will be described.

The difference between the container with pump of the sixth embodiment and that of the fifth embodiment is that a seal is formed in an inner lid F fitted to the neck 405 of the container body D instead of providing the seal 425 formed in the lower end of the periphery of the cylinder 421 of the pump E.

The inner lid F is made of synthetic resin and comprises a cylindrical portion 432 provided with a flange 431 at the upper edge thereof and a ring-like seal 433 disposed on the lower end of the cylindrical portion 432 and projecting inward.

The seal 433 has a contact surface 434 around the inner circumference thereof which comes in contact with the outer surface of the cylinder 421 to compress the outer surface in such a manner as to seal the container body D during the installation of the pump.

The pump E is installed by fitting the inner lid F to the neck 405 and then inserting the cylinder 421 of the pump E into the inner lid F.

As the lower end of the cylinder 421 is in contact with the seal 433, the inside of the container body D is sealed. As the pump E is further pushed down, the pre-separating air within the space 408 is discharged through the air suction hole 406 corresponding to the volume of the cylinder 421 inserted through the seal 433.

Since the inside of the container body D is in the sealed state, the level of the liquid content is lowered corresponding to the descent of the pump E so that the level becomes L2 from L1. Once the cylinder 421 reaches the level, the volume of the cylinder 421 submerged into the liquid content is replaced by the volume of air discharged from the space 408 so that the level does not change.

The pump E is installed to the container body D by pushing down the cylinder 421 to the lowest position and then fitting the cap 420 to the neck 405.

Since the container body D is tightly sealed after the installation of the pump, the air within the space 408 is no longer discharged and the upper space in the container body D and the level of the liquid content are kept constant.

The description will now be made as regard to the relation between the upper space in the container body D and the volume of pre-separating air.

Assuming that Qa is the initial volume of the pre-separating air filled into the space 408 during the pre-separation before the installation of the pump, Qb is the volume of the air discharged from the space 408 during the installation of the pump, Qc is the volume of residual air remaining in the space 408 after the installation of the pump, Vo is the volume of the upper space in the container body D after the installation of the pump in case of the container body D without the extended portion 409, V is the volume of the upper space in the container body D after the installation of the pump in case of the container body D with the extended portion 409 of this embodiment (the upper space in case of the six embodiment indicates a space under the seal 433 of the inner lid F), s is the length between the seal 433 and the lower end of the cylinder 421 when the pump E is fitted to the container body D, and $r_c$ is the radius of the cylinder 421, the following expression holds for the volume of the discharged air:

$$Qb=\pi r_c^2 s$$

when the compression of the air within the container body D is neglected.

The discharged volume Qb is a constant value because it is found from the dimensions of the pumping member (the cylinder 421).

As well as the case of the fifth embodiment, the following expression holds with regard to the relation between the volumes V, Vo: 2 V=Vo−Qc=Vo−(Qa−Qb).

In the above expression, since Vo is a constant value and Qb is also a constant value, it is found that the volume V of the upper space in case of this embodiment having the extended portion 409 is variable corresponding to the initial value Qa.

Therefore, the sixth embodiment has also the same effects as the fifth embodiment by controlling the initial value Qa.

In addition, since the inner lid F is fitted into the neck 405 in the sixth embodiment, the upper space can be further reduced than the fifth embodiment.

As mentioned above, during pushing down the pump E for installing the pump, while the level of the liquid content is lowered from the point where the lower end of the cylinder 421 comes in contact with the ring-like seal 433 to the point where the cylinder 421 reaches the level, the level does not change after that.

When the liquid content is filled close to the seal 433 of the inner lid E, the level slightly rises by the insertion of the suction pipe 427 and after that little variation in the level is caused. This exhibits an effect of predicting the level in filling the liquid content.

Since the air within the space 408 is discharged by installing the pump E to the container body D, the step for blowing air into the container body D in order to discharge the pre-separating air is not necessary in the pre-separation process, thereby facilitating the manufacturing process.

Moreover, the state of the pre-separation can be inspected just by observing the inside of the container body D from the upper side of the neck 405 of the container A.

In addition, as the upper space in the upper space is small so that the liquid content does not splash when the consumer has the container A in his/her hand, this gives a consumer the impression of fulfillment, thereby improving the value as a commercial product.

[Seventh Embodiment]

Figure 30:
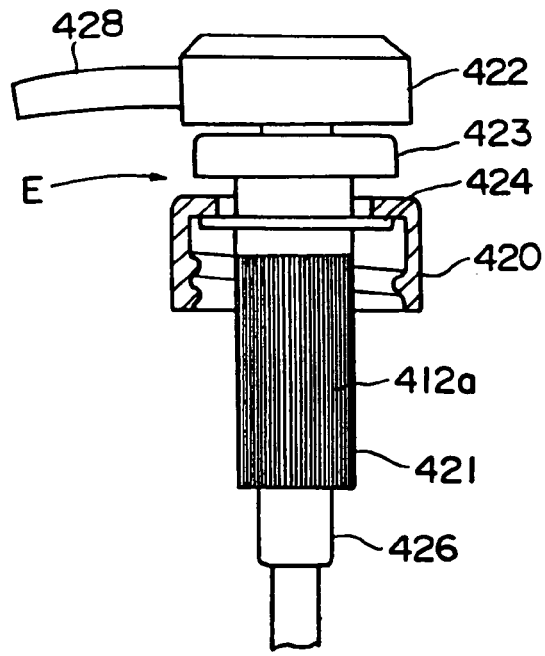
FIG. 30 is a front view of a pump of a container with pump according to a seventh embodiment of the present invention.
Figure 31:
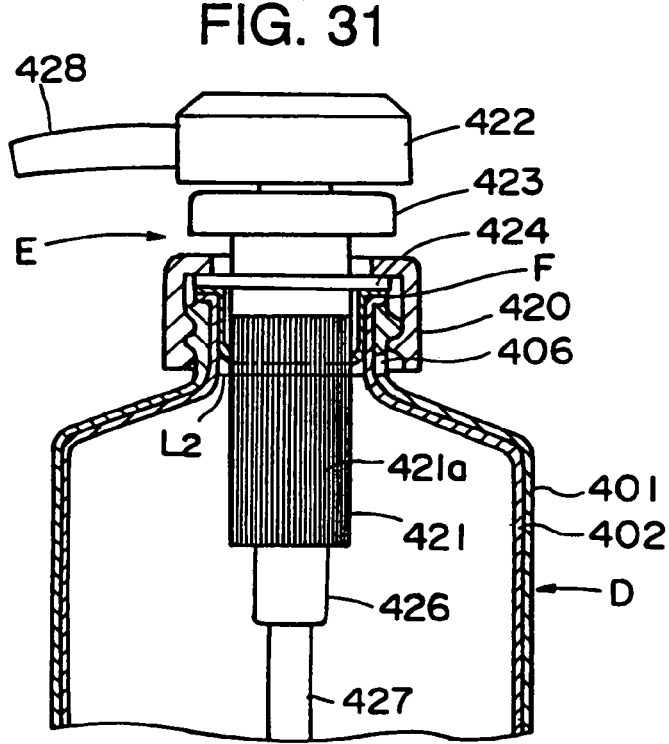
FIG. 31 is a sectional view showing the container with pump when the installation of the pump is completed according to the seventh embodiment of the present invention.

With reference to FIG. 30 and FIG. 31, a container with pump according to a seventh embodiment will be described.

In the container with pump of the sixth embodiment as mentioned above, the level of the liquid content rises according to the descent of the cylinder 421 after Qa=Qb and the air within the container body D is compressed when the initial volume Qa is set to be smaller than the discharged volume Qb (Qa<Qb).

In the container with pump of the fifth embodiment, since the sealed state of, the container body is released when the seal 425 of the cylinder 421 is lowered below the lower edge 405c of the neck 405, the compressed air is discharged into the atmosphere so that there is no problem.

On the other hand, in case of the sixth embodiment, since the seal 433 of the inner lid F is in contact with the outer surface of the cylinder 421 to compress the outer surface and the sealed state is kept to the end, the air within the container body D is compressed so that there is a problem of rise in the inner pressure of the container body D.

To overcome this problem, it is needed, of cause, to control of the initial volume Qa not to make the upper space negative and, additionally, to provide means for allowing the release of the compressed air.

The seventh embodiment is a container with pump provided with such a compressed air releasing means.

Figure 32:
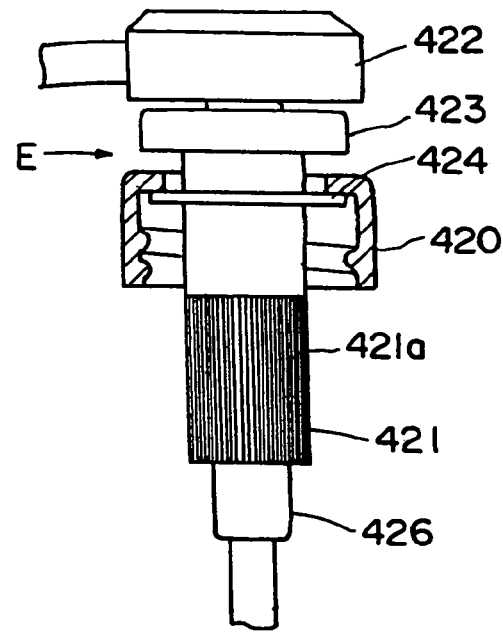
FIG. 32 is a front view of a conventional container with pump.

Conventionally, as shown in FIG. 32, there is a pump which is provided with narrow grooves 421a through which air flows formed in the outer surface of the cylinder 421 in order to completely pour out the liquid content. However, the upper ends of the grooves 421a of the conventional container does not reach the seal 433 of the inner lid F.

In the container with pump of the seventh embodiment, as shown in FIG. 31, the cylinder 421 has narrow grooves 421a formed in the outer surface the cylinder 421 between the lower edge thereof and at least to a position where the grooves reach the seal 433. The grooves constitute the compressed air releasing means.

The contact surface 434 of the ring-like seal 433 of the inner lid F is compressing the outer surface of the grooves 421a, thereby allowing the flow of air between the cylinder 421 and the seal 433 and preventing the flow of the liquid content therebetween because of its viscosity.

Therefore, when the air within the container body D is compressed after $Qa \leq Qb$, the compressed air is discharged through the grooves 421a, thereby preventing the rise in the inner pressure of the container body D.

Though the compressed air releasing means is made up of the narrow grooves 421a formed in the outer surface of the cylinder 421 in this embodiment, the compressed air releasing means may be made up of the roughed surface made by blasting the outer surface of the cylinder 421.

[Eighth Embodiment]

Figure 33:
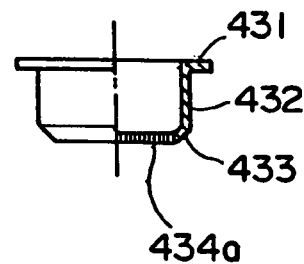
FIG. 33 is a half-sectional view of an inner lid of a container with pump according to an eighth embodiment of the present invention.
Figure 34:
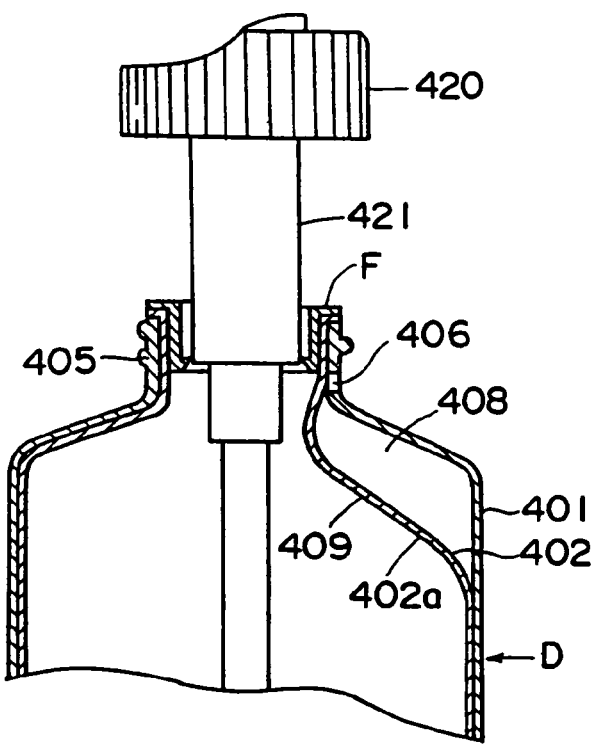
FIG. 34 is a sectional view showing components of a container with pump in an initial stage of installing a pump according to a ninth embodiment of the present invention.

With reference to FIG. 33, a container with pump according to an eighth embodiment will be described.

Though the compressed air releasing means is made up of the grooves or the roughened surface formed in the outer surface of the cylinder 421 of the pump E in the seventh embodiment described above, the compressed air releasing means according to the eighth embodiment is made up of narrow grooves or roughened surface 434a formed in the contact surface 434 of the inner lid F.

In this case, there is an advantage of using a conventional cylinder 421 without any change.

[Ninth Embodiment]

With reference to FIG. 34 through FIG. 37, a container with pump according to a ninth embodiment will be described.

The ninth embodiment is also the container with pump having an compressed air releasing means in an inner lid F.

Figure 36:
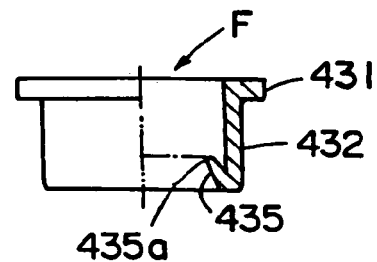
FIG. 36 is a half-sectional view of an inner lid of the container with pump according to the ninth embodiment of the present invention.
Figure 35:
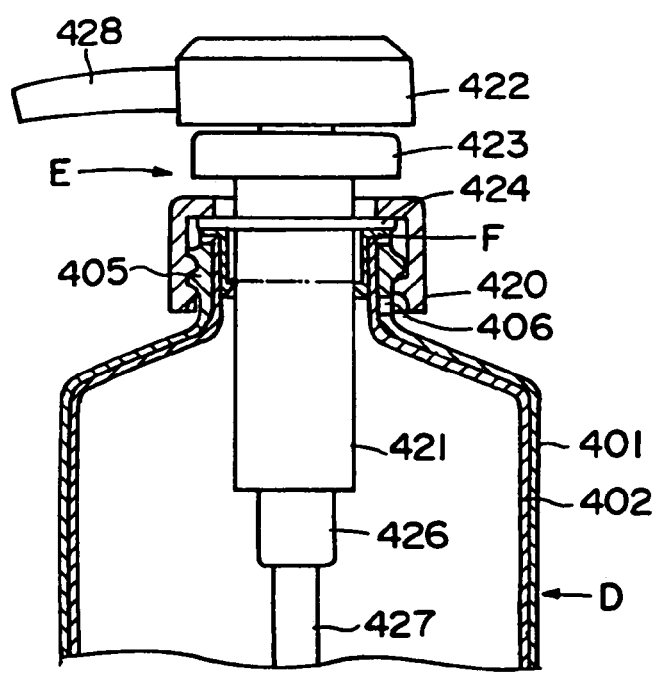
FIG. 35 is a sectional view showing components of the container with pump when the installation of the pump is completed according to the ninth embodiment of the present invention.

As shown in FIG. 36, the inner lid F used for the container with pump of the ninth embodiment comprises a flange 431, a cylindrical portion 432, and a ring-like flexible seal 435 projecting inward and upward from the lower edge of the cylindrical portion 432, wherein the seal 435 comes in contact with the outer surface of the pump E tightly.

The inner lid F is made of flexible synthetic resin. Therefore, when the inner pressure of the container body D rises, the seal 435 is deformed and its end 435a is extended to form a space between the seal 435 and the cylinder 421 through which the compressed air and/or the liquid content are discharged.

Therefore, when the air within the container body D is compressed because the initial volume Qa is set to be smaller than the discharged air Qb (Qa<Qb), the compressed air is discharged through the space.

Figure 37:
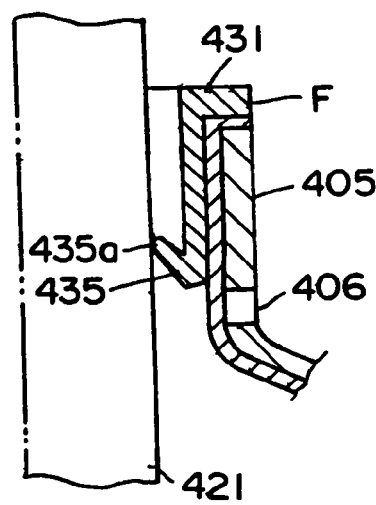
FIG. 37 is an enlarged sectional view of components of the container with pump according to the ninth embodiment of the present invention, showing the state filled with liquid content.

In the ninth embodiment, since the flexible seal 435 projects inward and upward, it is quite easy to completely fill the liquid content beneath the inner lid F as shown in FIG. 37 when the volume of the upper surface after filling the liquid content and before installing the pump is set to be equal to the volume of the valve seat cylinder 426 and the suction pipe 427 of the pump E. This is because, after installation of the pump, the level of the liquid content rises to the seal 435 and after that the level does not change.

In this case, since the liquid content escapes through the space, there is no problem even when the level of the liquid content rises over the seal 435 if it is a little amount.

It should be understood that the container with pump of any one of the seventh embodiment, the eighth embodiment, and the ninth embodiment exhibits the same effects as the sixth embodiment when the initial volume Qa is set to be greater than the discharged volume Qb ($Qa \geq Qb$).

Though a pump generally used has been employed as the pump E in the container with pump of any one of the fifth embodiment through the ninth embodiment, the pump E of the present invention is not limited to the pump of the embodiments and may be any pump which can suck up and discharge the fixed amount of liquid content by the action of the operational member, with the cylinder members thereof being inserted into the container body D.

INDUSTRIAL APPLICABILITY

The separable laminated container of the present invention allows the inner layer to be securely and easily separated from the outer layer and can be used as a container for accommodating various types of liquid such as face lotion, shampoo, and rinse, and is particularly suited for a container with pump.

The invention claimed is:

1. A container with a pump, comprising:
   (a) a container body made up of an inner layer and an outer layer which are made of synthetic resin and separably laminated on each other, wherein the outer layer has an air suction hole formed therein and a portion of said inner layer adjacent to the air suction hole is partly separated from the outer layer;
   (b) a pump comprising a cylinder inserted into the container body through a neck of said container body and a cap whereby the pump is hermetically fitted to said neck; and
   (c) an inner lid having a cylindrical portion with upper and lower edges, a flange disposed at the upper edge and a ring-like seal disposed at the lower edge, the ring-like seal coming in contact with the outer surface of the cylinder of said pump tightly, and fitted in the neck of said container body.

2. The container with the pump as claimed in claim 1, wherein said cylinder has a narrow groove or a roughened surface on the outer surface thereof extending from the lower edge thereof to a position above the seal of the inner lid after installation of the pump.

3. A container with a pump, comprising:
(a) a container body made up of an inner layer and an outer layer which are made of synthetic resin and separably laminated on each other, wherein the outer layer has an air suction hole formed therein and a portion of said inner layer adjacent to the air suction hole is partly separated from the outer layer;
(b) a pump comprising a cylinder inserted into the container body through a neck of said container body and a cap whereby the pump is hermetically fitted to said neck; and
(c) an inner lid having a ring-like seal coming in contact with the outer surface of the cylinder of said pump tightly, and fitted in the neck of said container body, wherein said seal of said inner lid has a narrow groove or a roughened surface formed in a sealing surface thereof.

4. A container with a pump, comprising:
(a) a container body made up of an inner layer and an outer layer which are made of synthetic resin and separably laminated on each other, wherein the outer layer has an air suction hole formed therein and a portion of said inner layer adjacent to the air suction hole is partly separated from the outer layer;
(b) a pump comprising a cylinder inserted into the container body through a neck of said container body and a cap whereby the pump is hermetically fitted to said neck; and
(c) an inner lid having a ring-like seal coming in contact with the outer surface of the cylinder of said pump tightly, and fitted in the neck of said container body,
wherein said seal of said inner lid protrudes inward and upward in such a manner as to elastically expand and contract in the radial direction.

* * * * *